United States Patent
Kim et al.

(10) Patent No.: US 12,034,384 B2
(45) Date of Patent: Jul. 9, 2024

(54) ELECTRICITY GENERATING MODULE AND ELECTRICITY GENERATING METHOD

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Keon Jung Kim, Seoul (KR); Tae Jin Mun, Seoul (KR); Sung Min Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 419 days.

(21) Appl. No.: 17/419,576

(22) PCT Filed: Dec. 31, 2019

(86) PCT No.: PCT/KR2019/018811
§ 371 (c)(1),
(2) Date: Jun. 29, 2021

(87) PCT Pub. No.: WO2020/141865
PCT Pub. Date: Jul. 9, 2020

(65) Prior Publication Data
US 2022/0069738 A1    Mar. 3, 2022

(30) Foreign Application Priority Data
Dec. 31, 2018 (KR) .................... 10-2018-0173257

(51) Int. Cl.
*H02N 1/08* (2006.01)
*B63B 22/00* (2006.01)
(Continued)

(52) U.S. Cl.
CPC ............... *H02N 1/08* (2013.01); *B63B 22/00* (2013.01); *B63B 35/44* (2013.01); *B63C 9/13* (2013.01);
(Continued)

(58) Field of Classification Search
CPC ........ H02N 1/08; H02N 11/002; B63B 22/00; B63B 35/44; B63B 2035/4466;
(Continued)

(56) References Cited

U.S. PATENT DOCUMENTS

| | | | |
|---|---|---|---|
| 2009/0003014 A1* | 1/2009 | Jablonski | A43B 3/34 445/24 |
| 2018/0010571 A1* | 1/2018 | Werjefelt | F03B 13/20 |
| 2019/0175992 A1* | 6/2019 | Park | B63C 11/46 |

FOREIGN PATENT DOCUMENTS

| | | |
|---|---|---|
| JP | 2003-231494 A | 8/2003 |
| JP | 2014-146519 A | 8/2014 |

(Continued)

OTHER PUBLICATIONS

Shi Hyeong Kim, et al., "Harvesting electrical energy from carbon nanotube yarn twist", Energy Harvesting, Science, Aug. 25, 2017, pp. 1-6, vol. 357.

(Continued)

*Primary Examiner* — Loren C Edwards
(74) *Attorney, Agent, or Firm* — Sughrue Mion, PLLC

(57) ABSTRACT

Provided is an electricity generating module. The electricity generating module comprises: a cylinder; a piston that reciprocates inside the cylinder; and a power generating fiber of which one end is fixed to the piston and the other end (Continued)

is fixed to the cylinder, and of which the length varies according to the reciprocating of the piston, wherein, as the length of the power generating fiber varies, a potential value of the power generating fiber varies, and electricity is generated by using the varied potential value of the power generating fiber.

12 Claims, 29 Drawing Sheets

(51) Int. Cl.
  *B63B 35/44* (2006.01)
  *B63C 9/13* (2006.01)
  *B63C 9/20* (2006.01)
  *F03B 13/16* (2006.01)
  *F03B 13/20* (2006.01)

(52) U.S. Cl.
  CPC ............... *B63C 9/20* (2013.01); *F03B 13/16* (2013.01); *F03B 13/20* (2013.01); *B63B 2035/4466* (2013.01)

(58) Field of Classification Search
  CPC .. B63C 9/13; B63C 9/20; B63C 11/04; B63C 11/26; F03B 13/16; F03B 13/20; Y02E 10/30; F05B 2220/706
  See application file for complete search history.

(56) References Cited

FOREIGN PATENT DOCUMENTS

| | | | |
|---|---|---|---|
| JP | 2017-210224 | A | 11/2017 |
| KR | 10-2011-0054919 | A | 5/2011 |
| KR | 10-2013-0141901 | A | 12/2013 |
| KR | 10-2015-0038475 | A | 4/2015 |
| KR | 10-2016-0066298 | A | 6/2016 |
| KR | 10-1772315 | B1 | 8/2017 |
| KR | 10-2017-0122974 | A | 11/2017 |

OTHER PUBLICATIONS

International Search Report for PCT/KR2019/018811 dated Apr. 9, 2020 (PCT/ISA/210).

* cited by examiner

[Fig. 1]
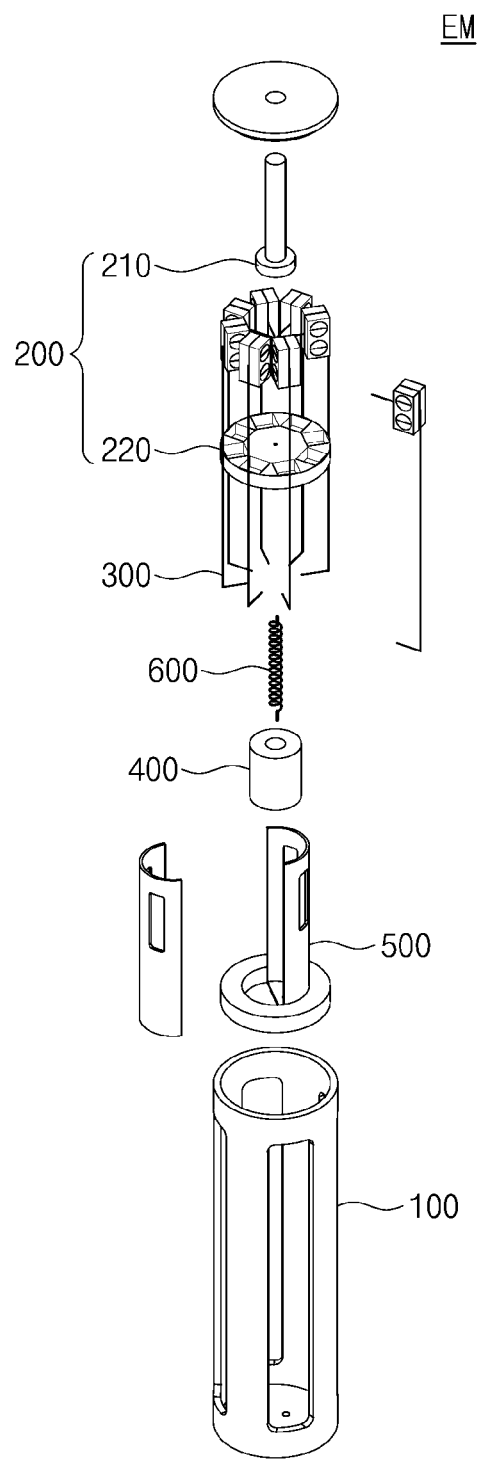

[Fig. 2]
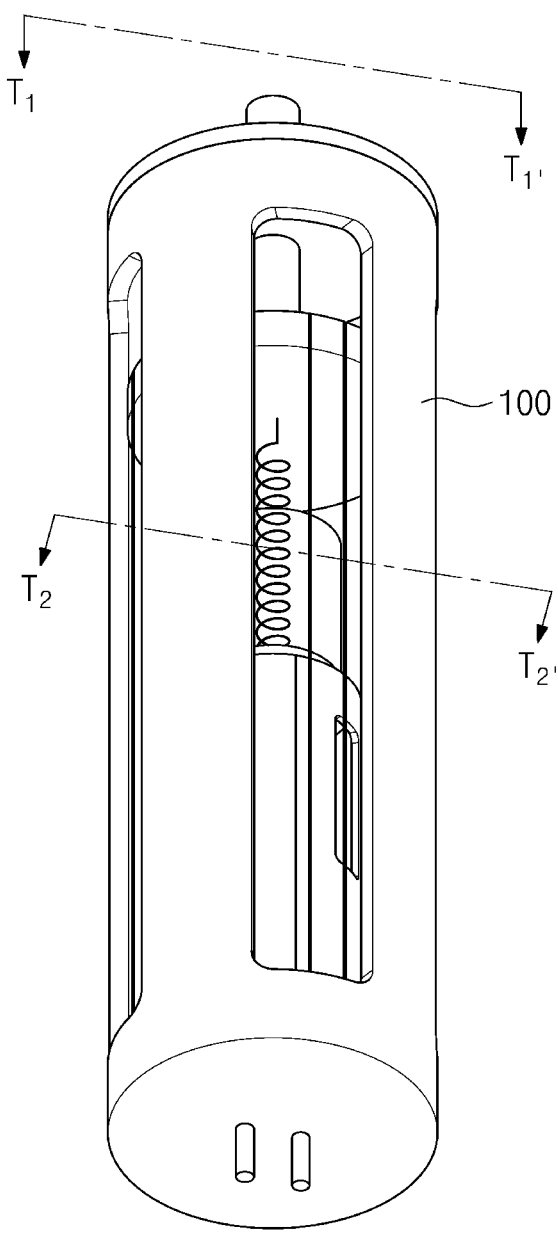

[Fig. 3]
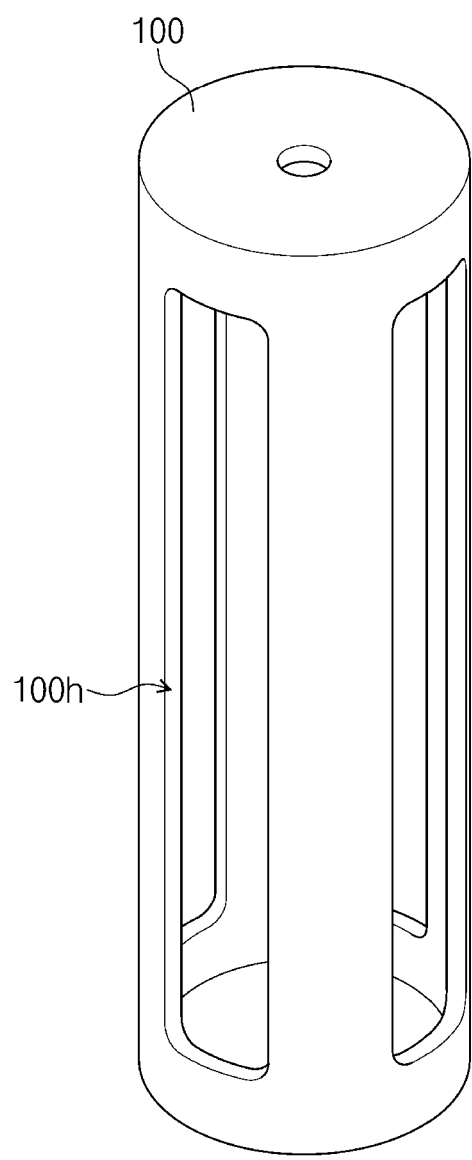

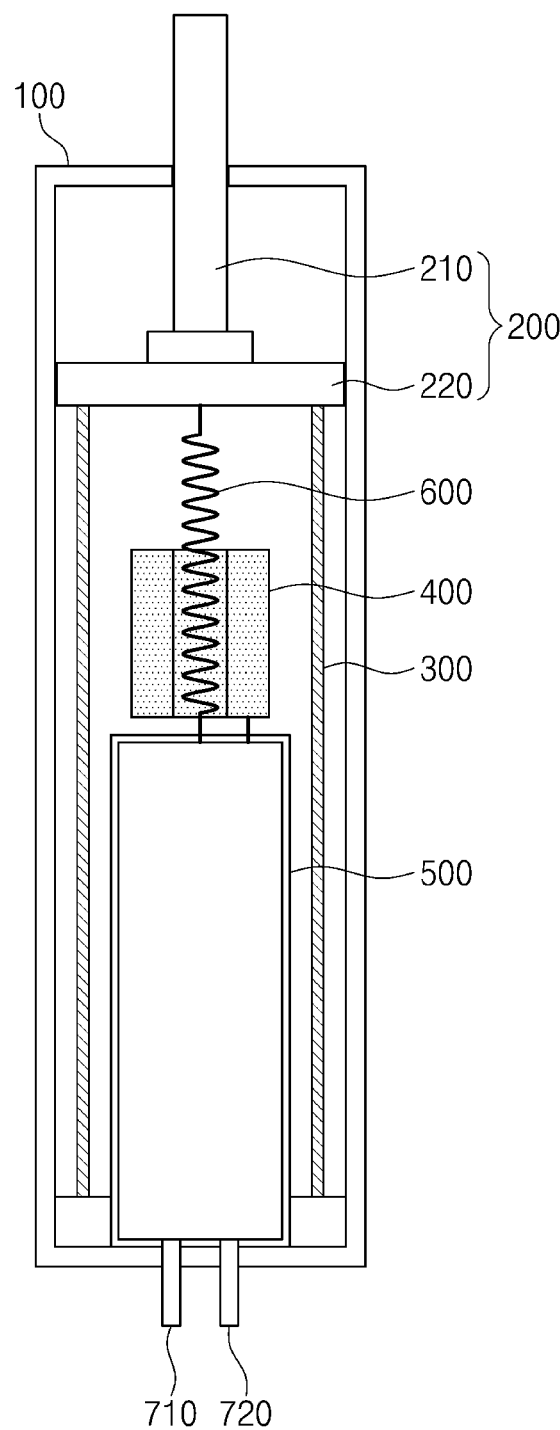
[Fig. 4]

[Fig. 5]
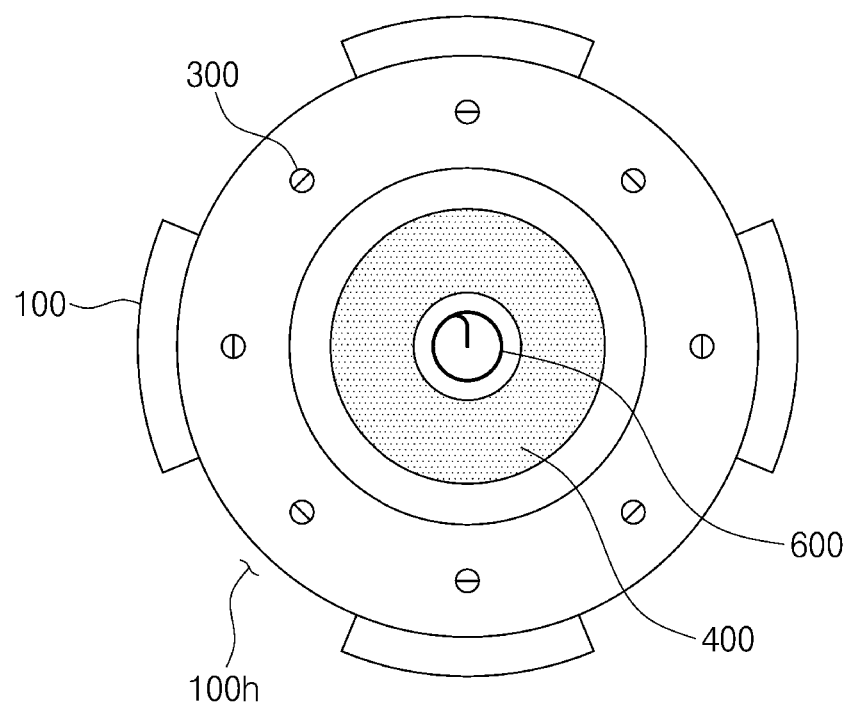

[Fig. 6]
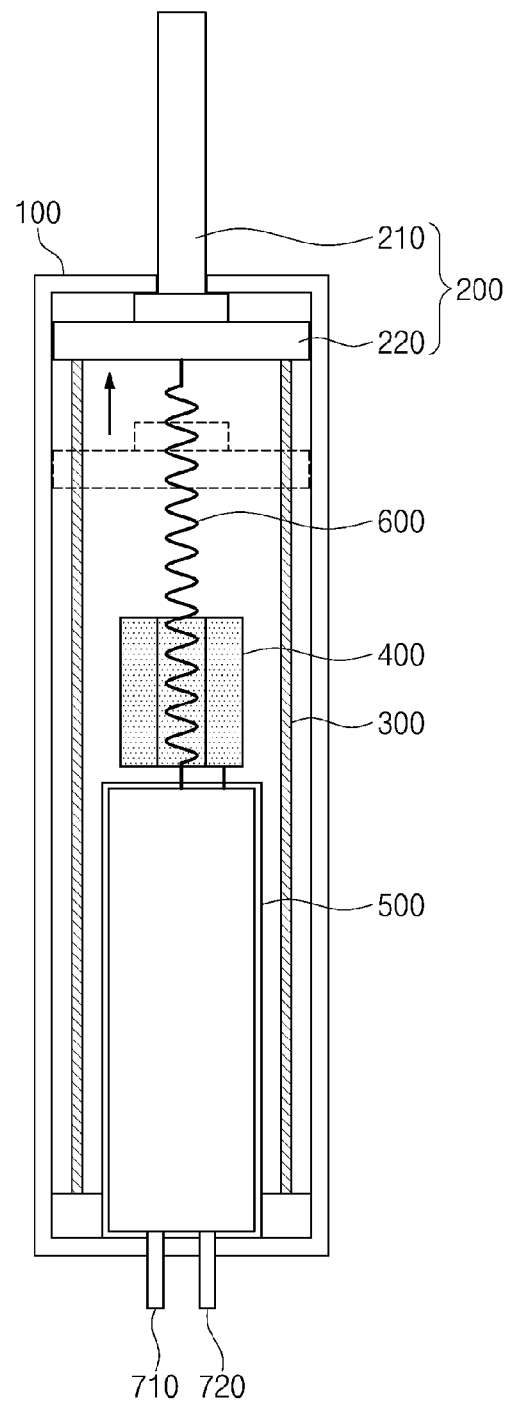

[Fig. 7]
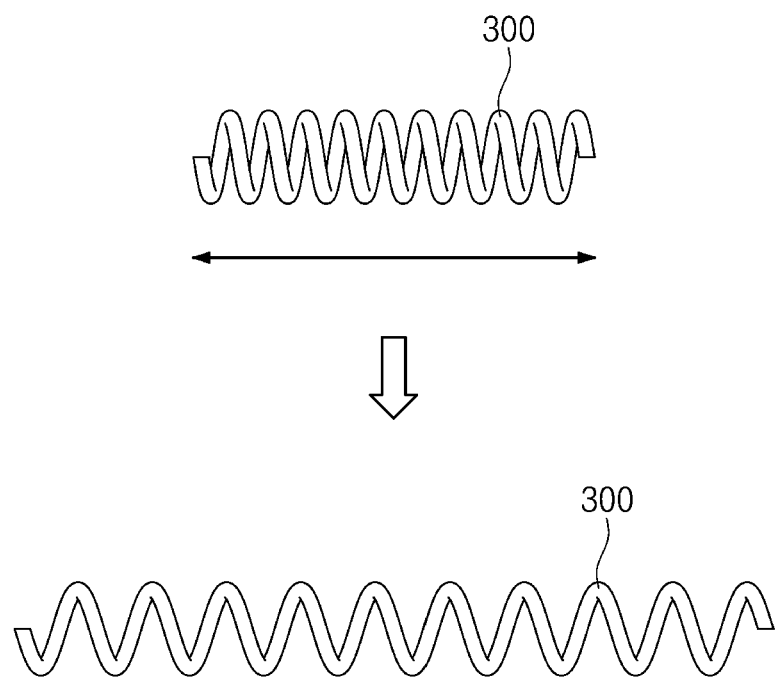

[Fig. 8]
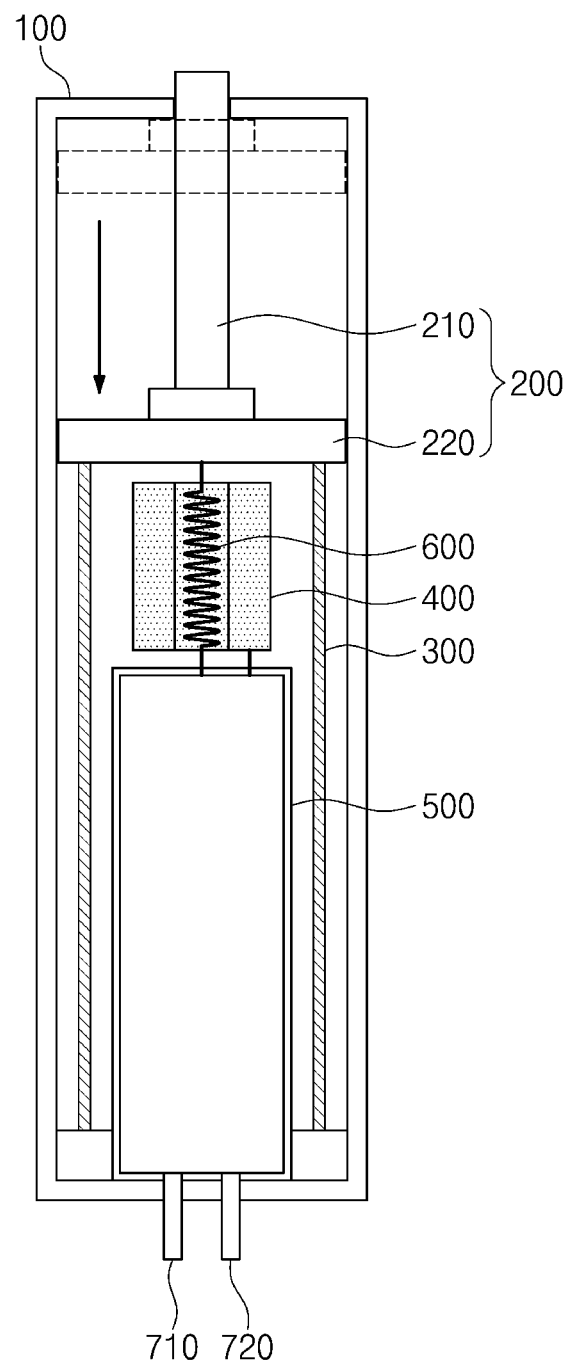

[Fig. 9]
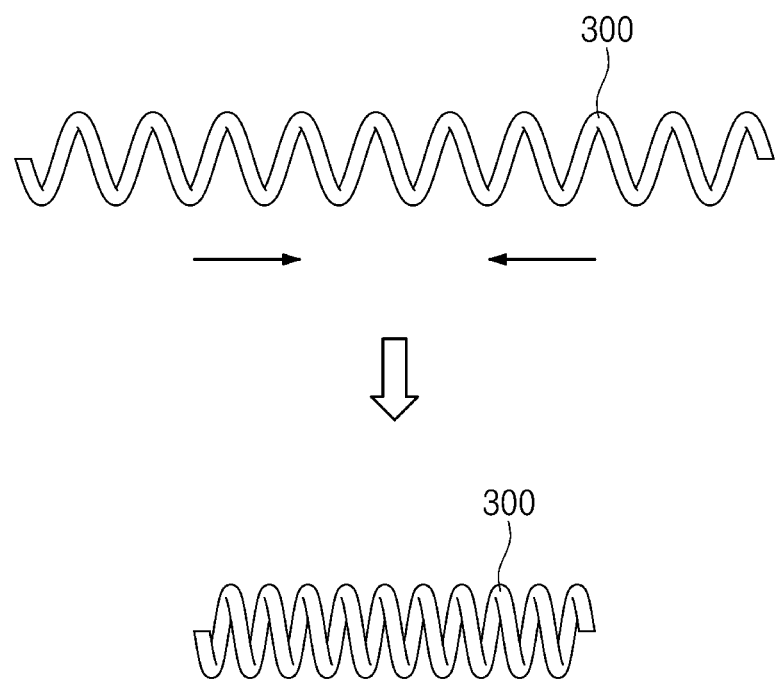

【Fig. 10】
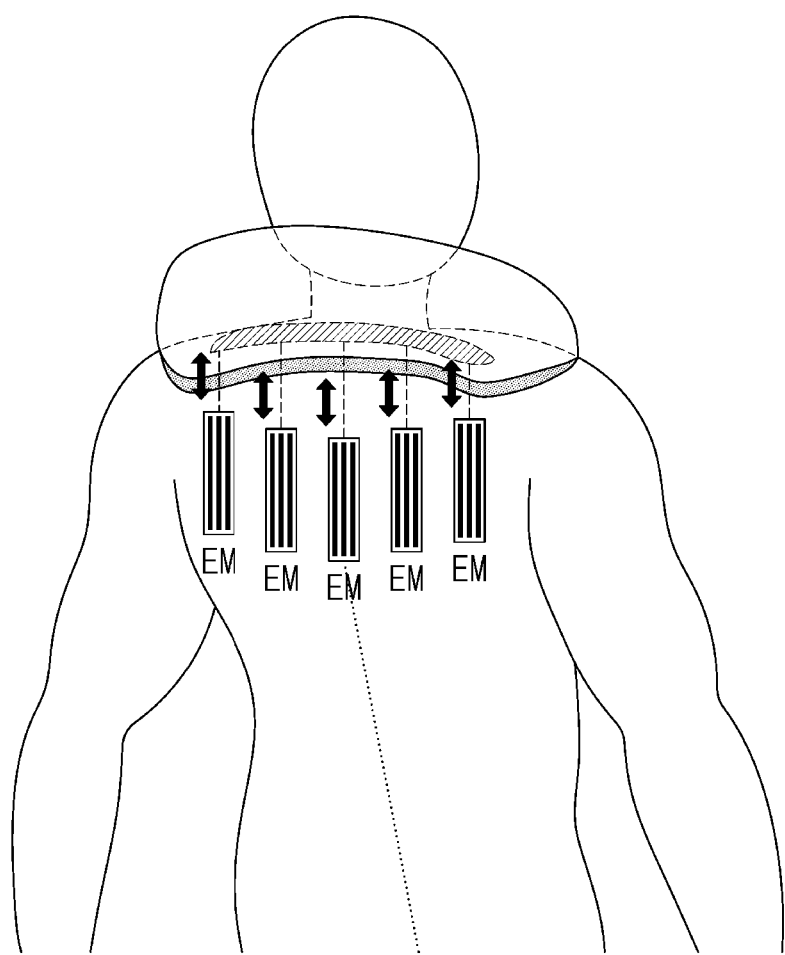

[Fig. 11]
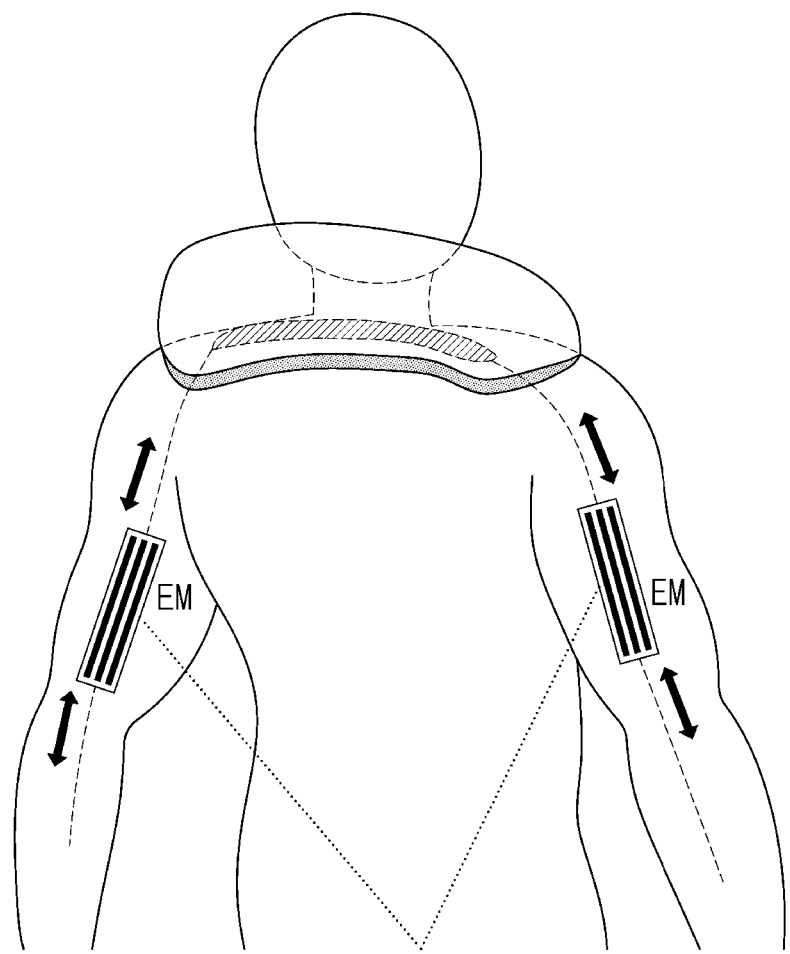

[Fig. 12]
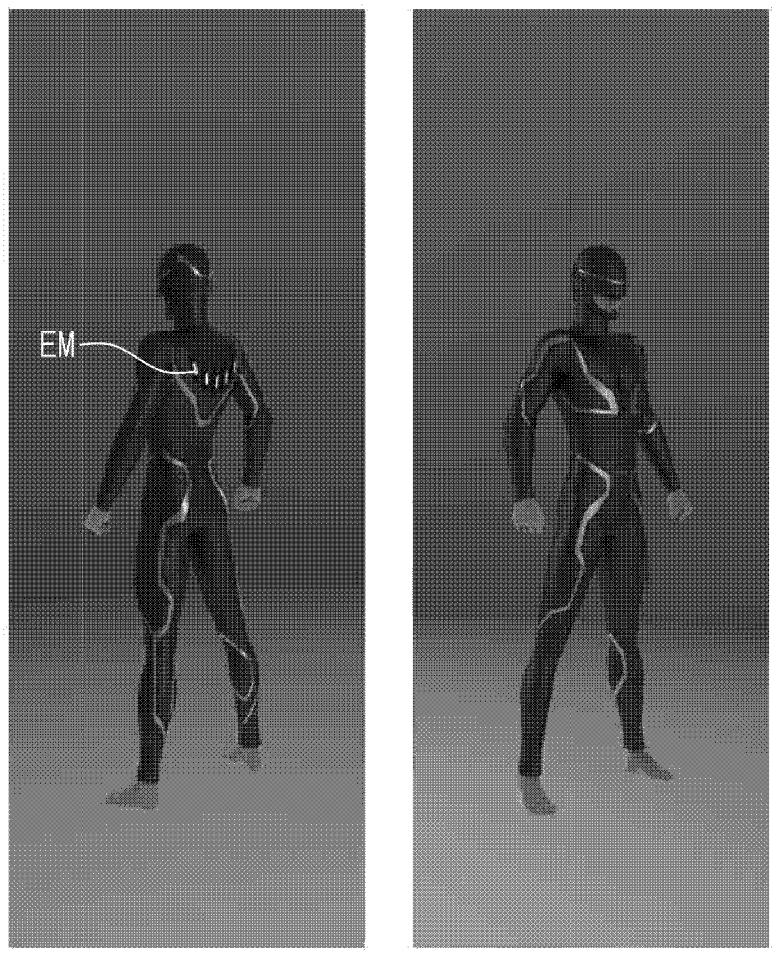

[Fig. 13]
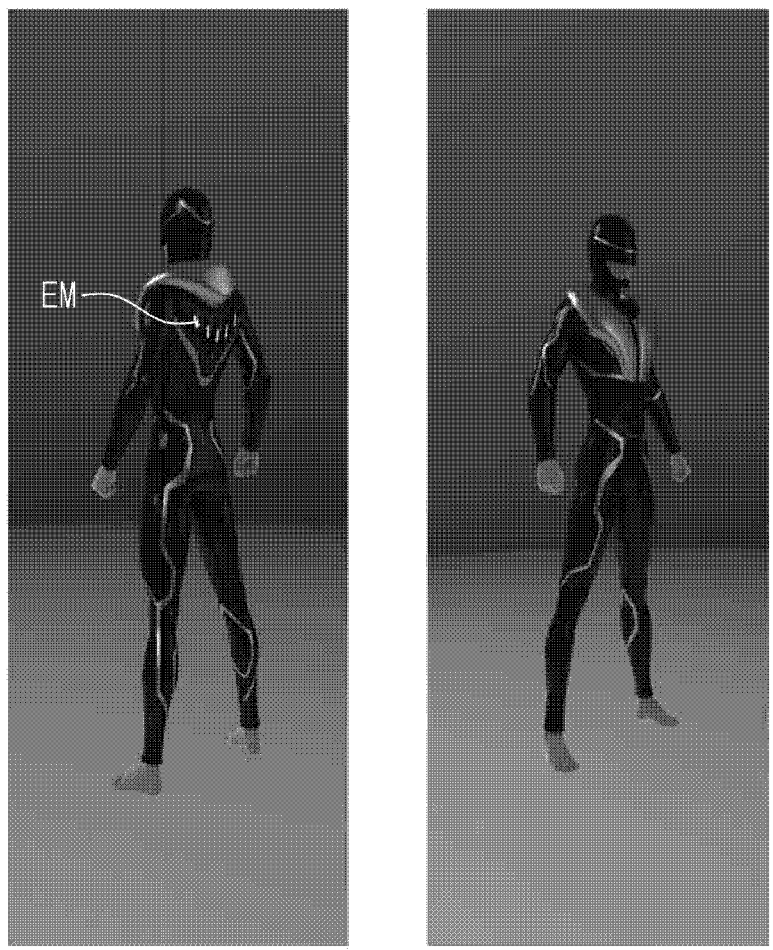

[Fig. 14]
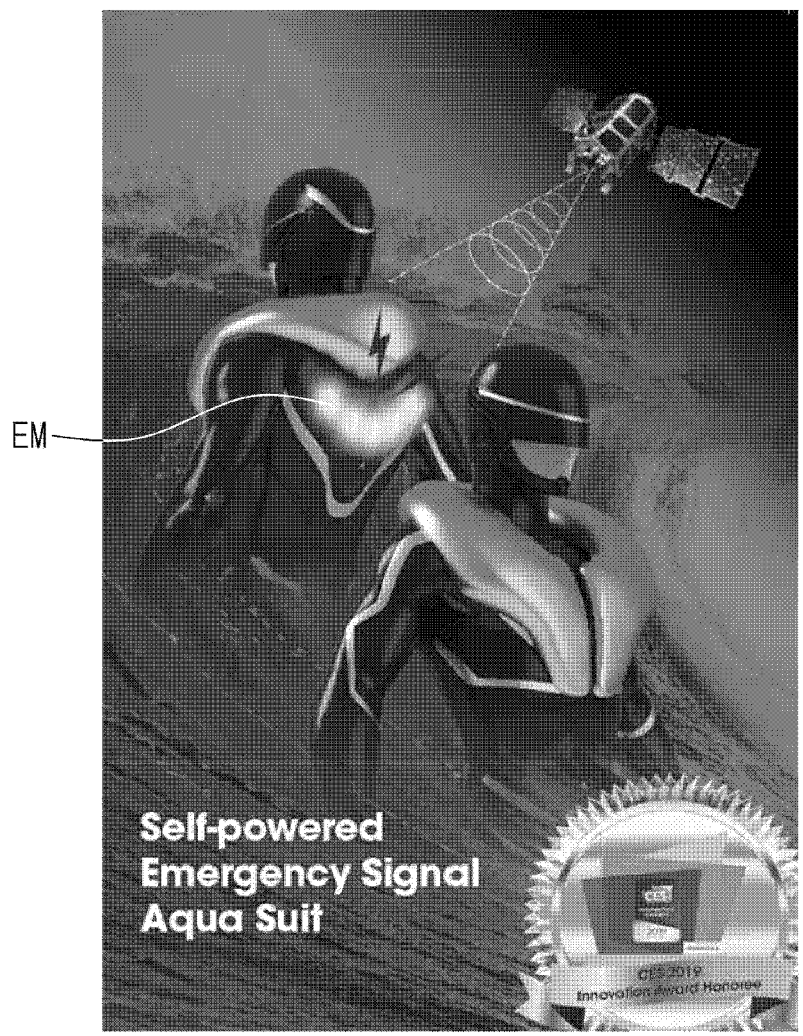

[Fig. 15]

[Fig. 16]
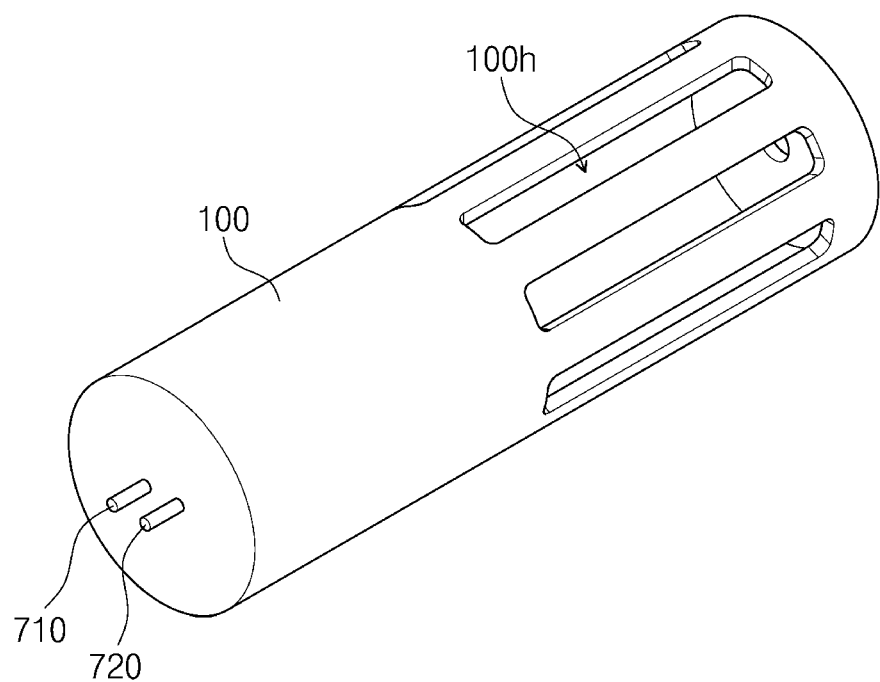

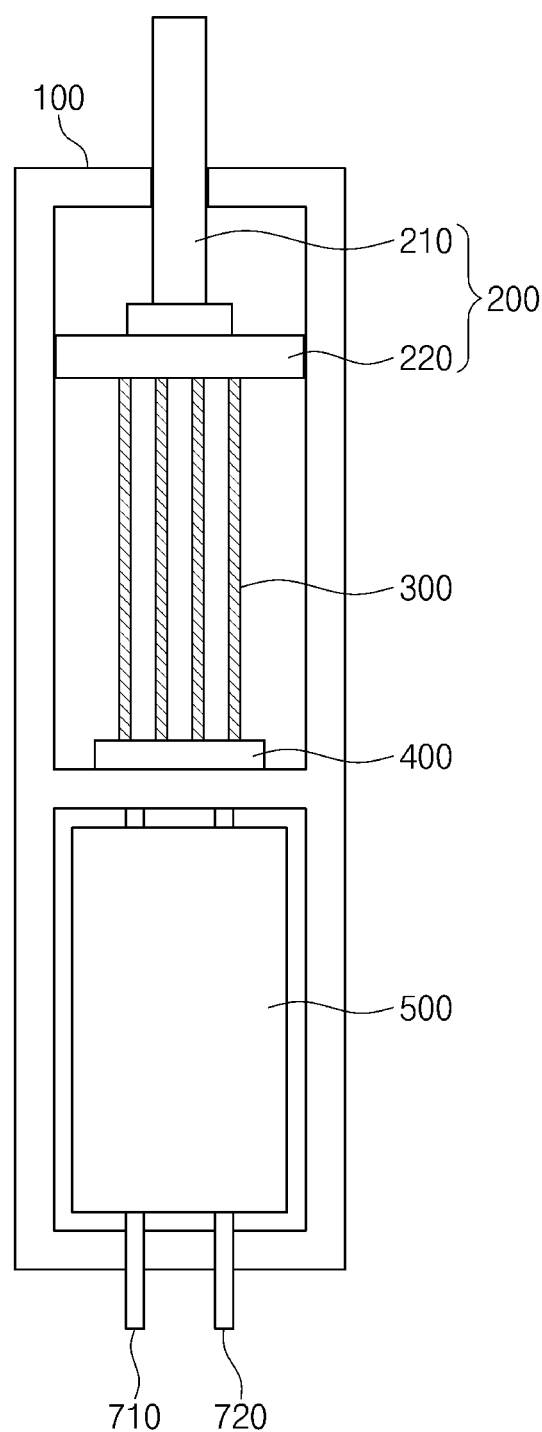
[Fig. 17]

[Fig. 18]
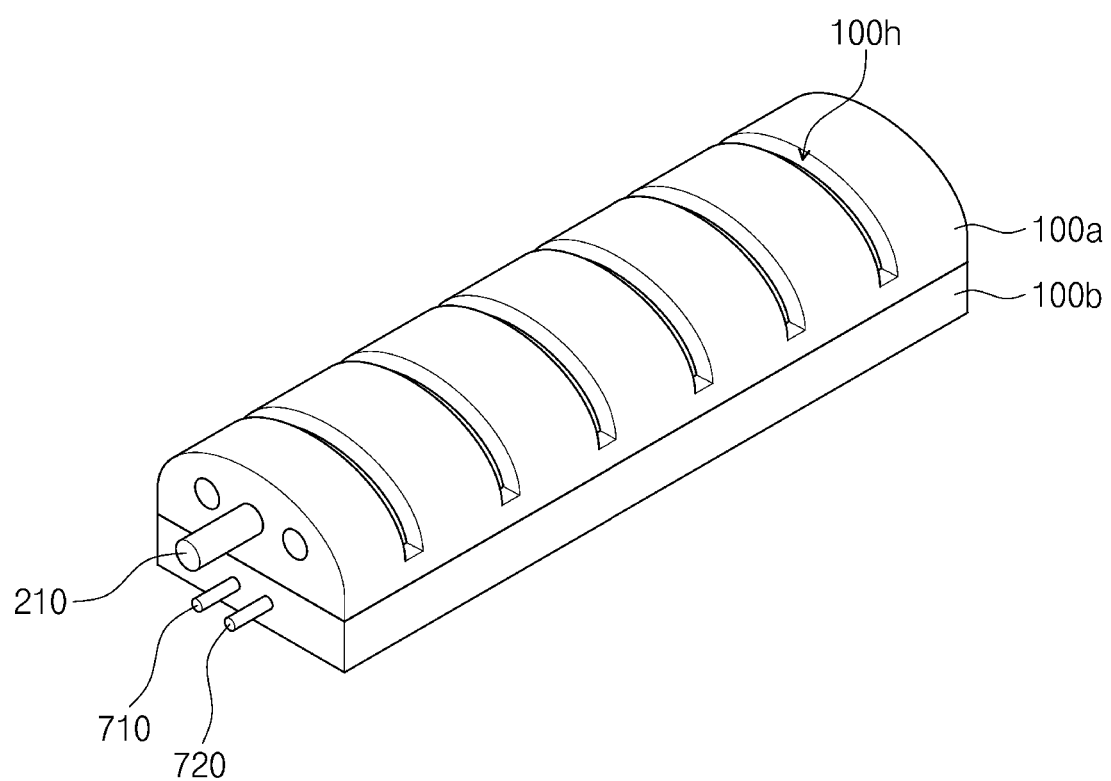

[Fig. 19]
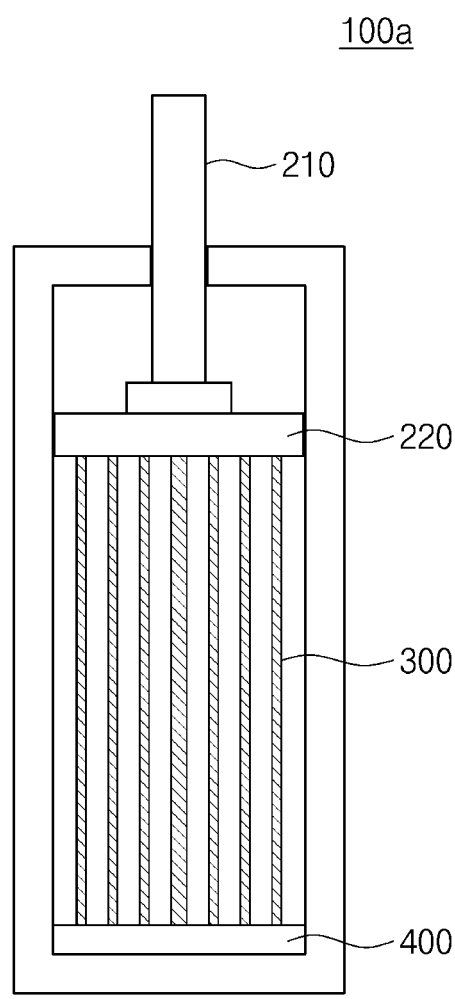

[Fig. 20]
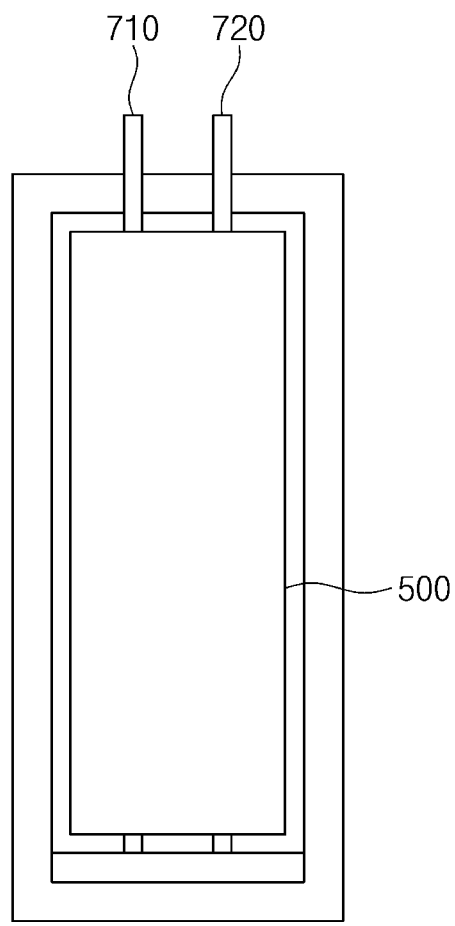

[Fig. 21]
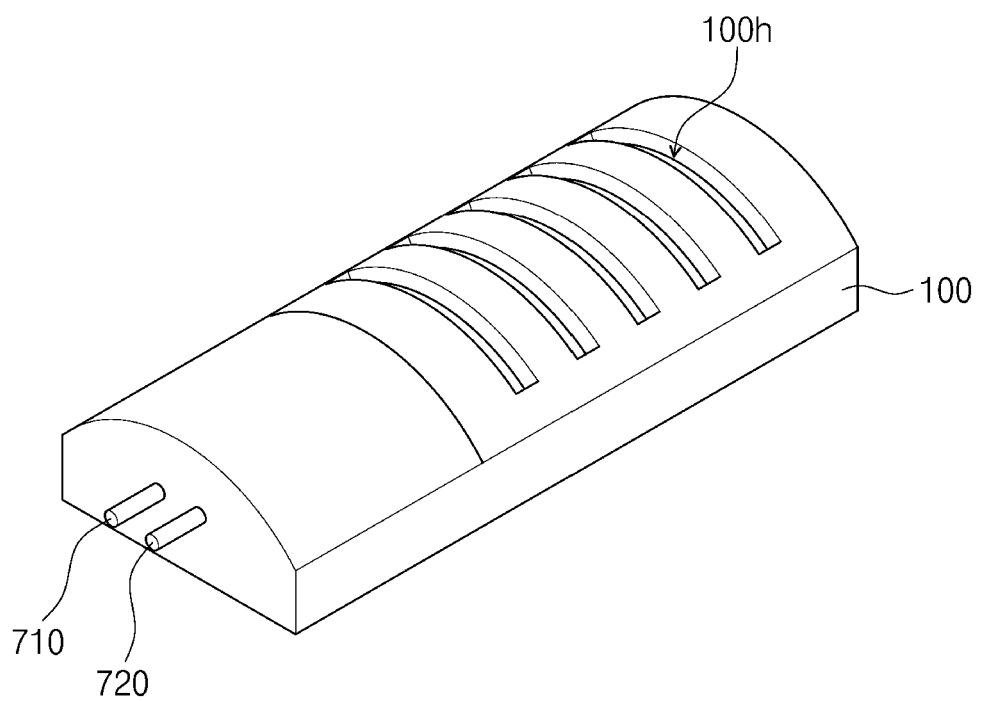

[Fig. 22]
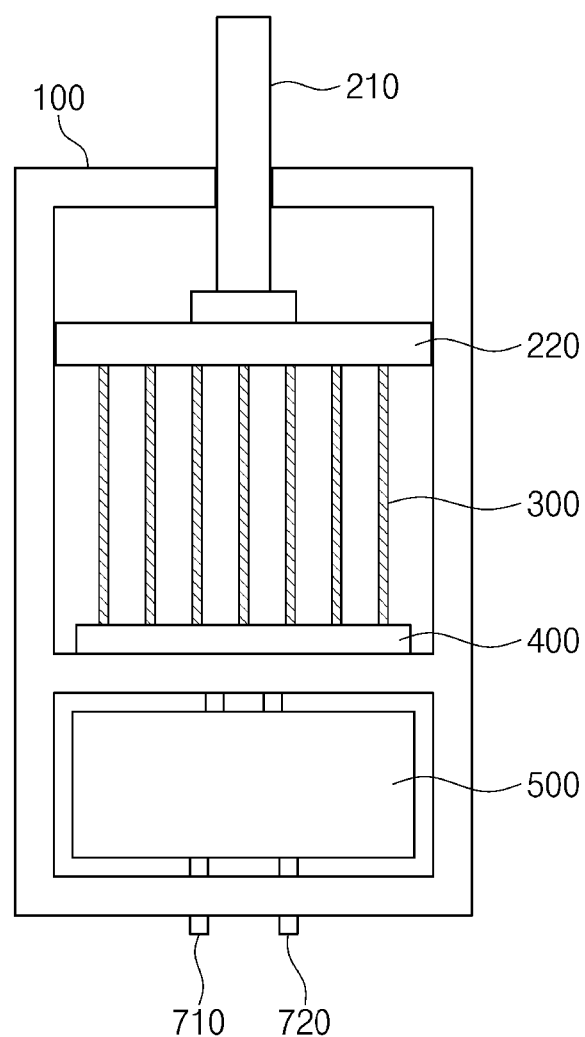

[Fig. 23]
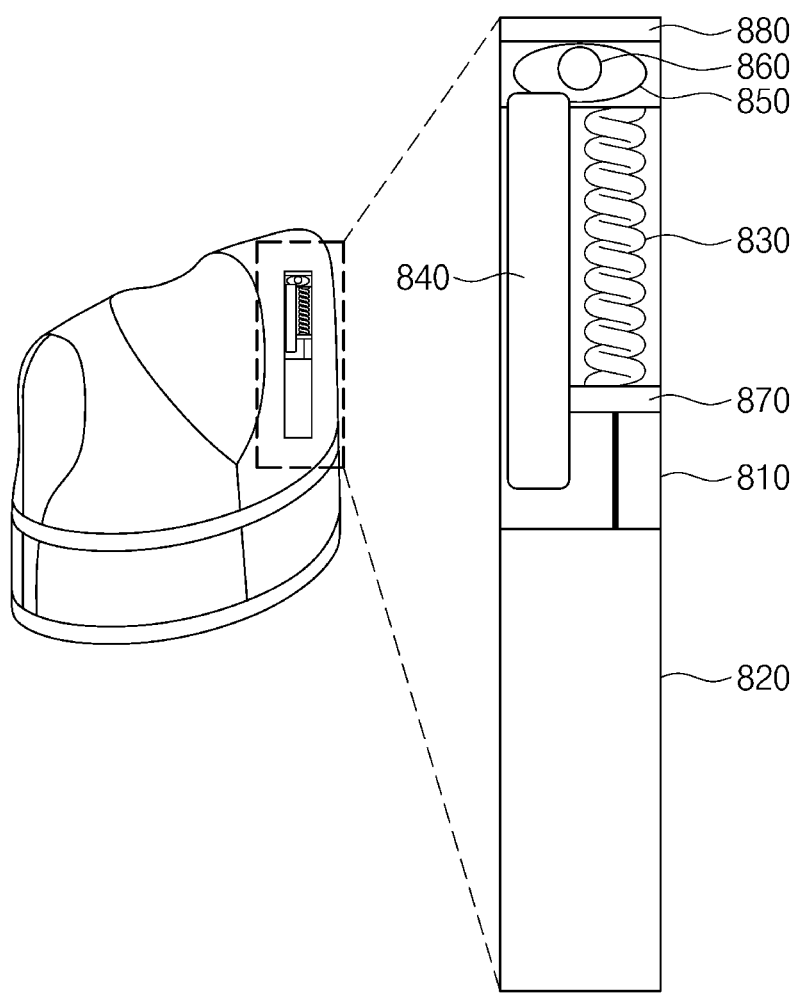

[Fig. 24]
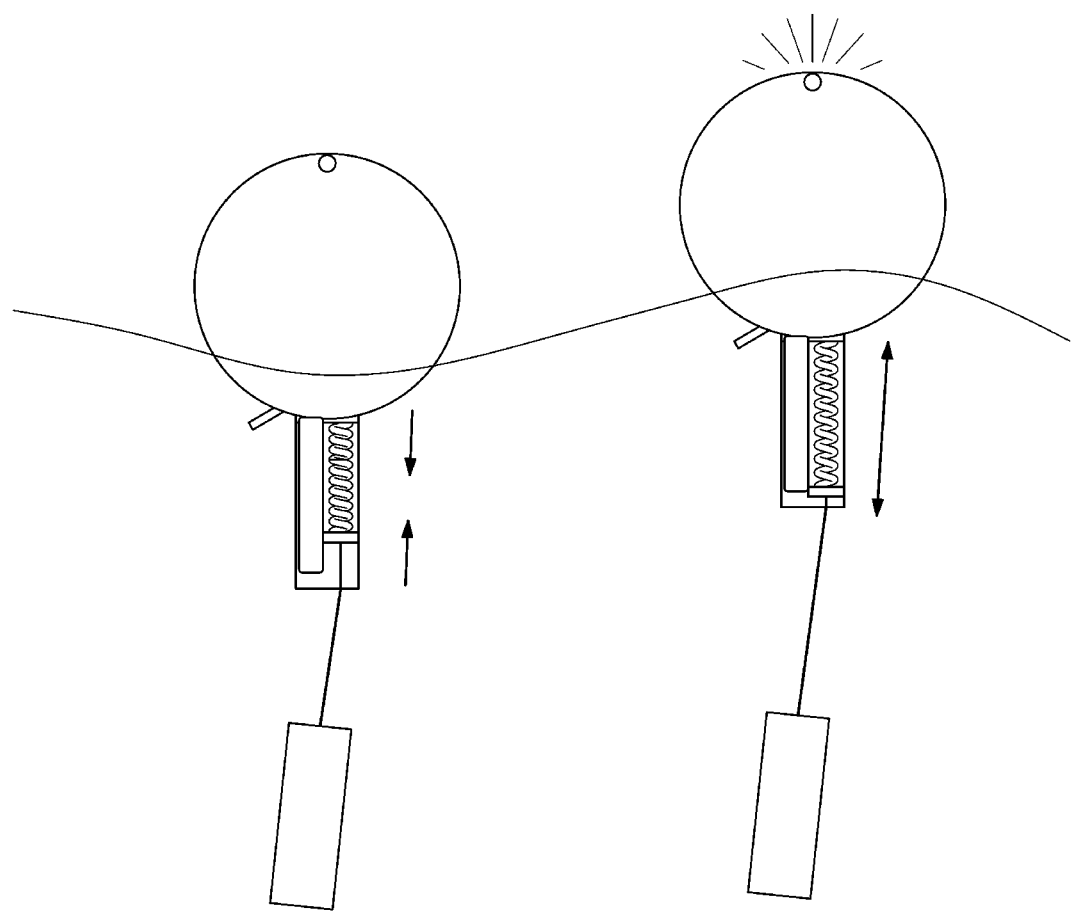

[Fig. 25]
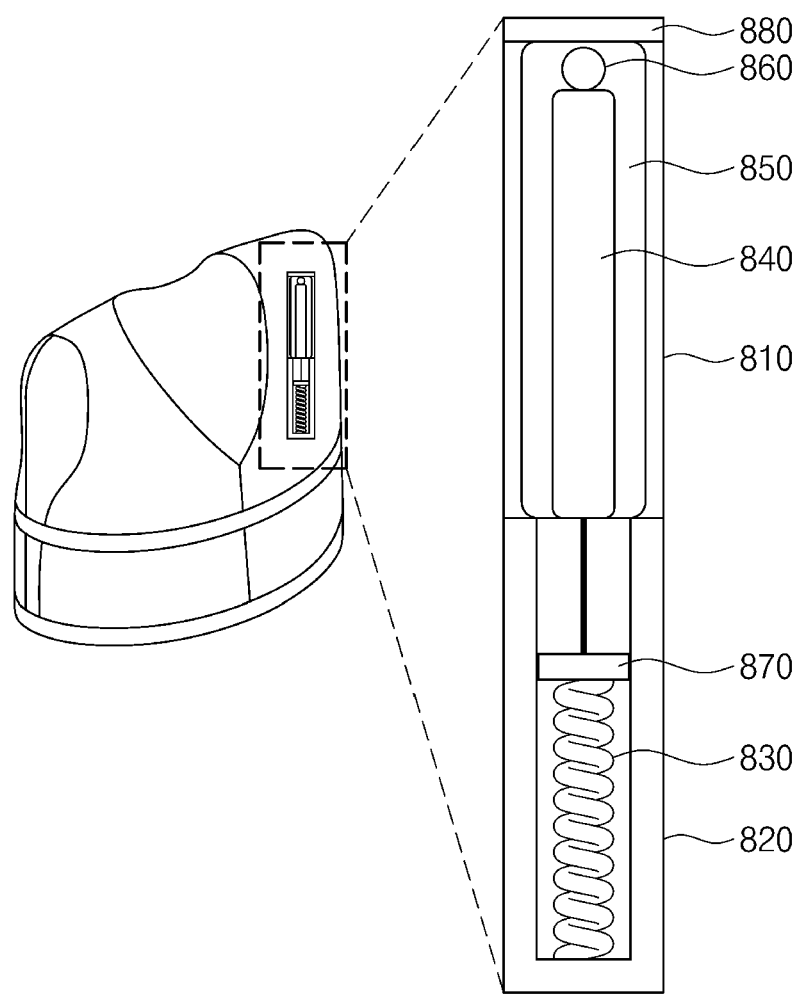

[Fig. 26]
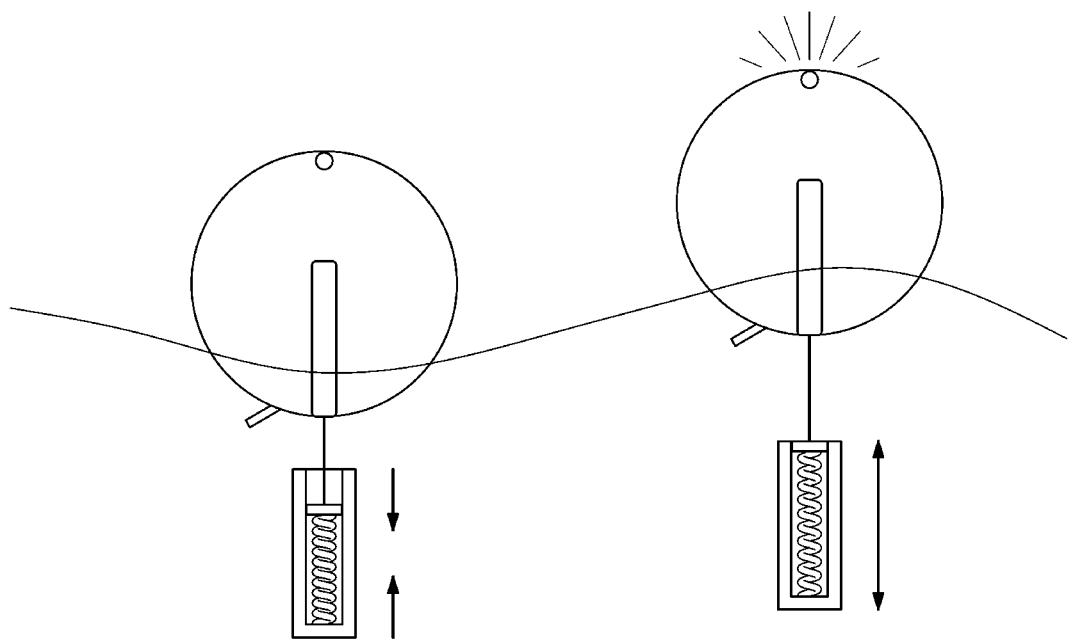

[Fig. 27]
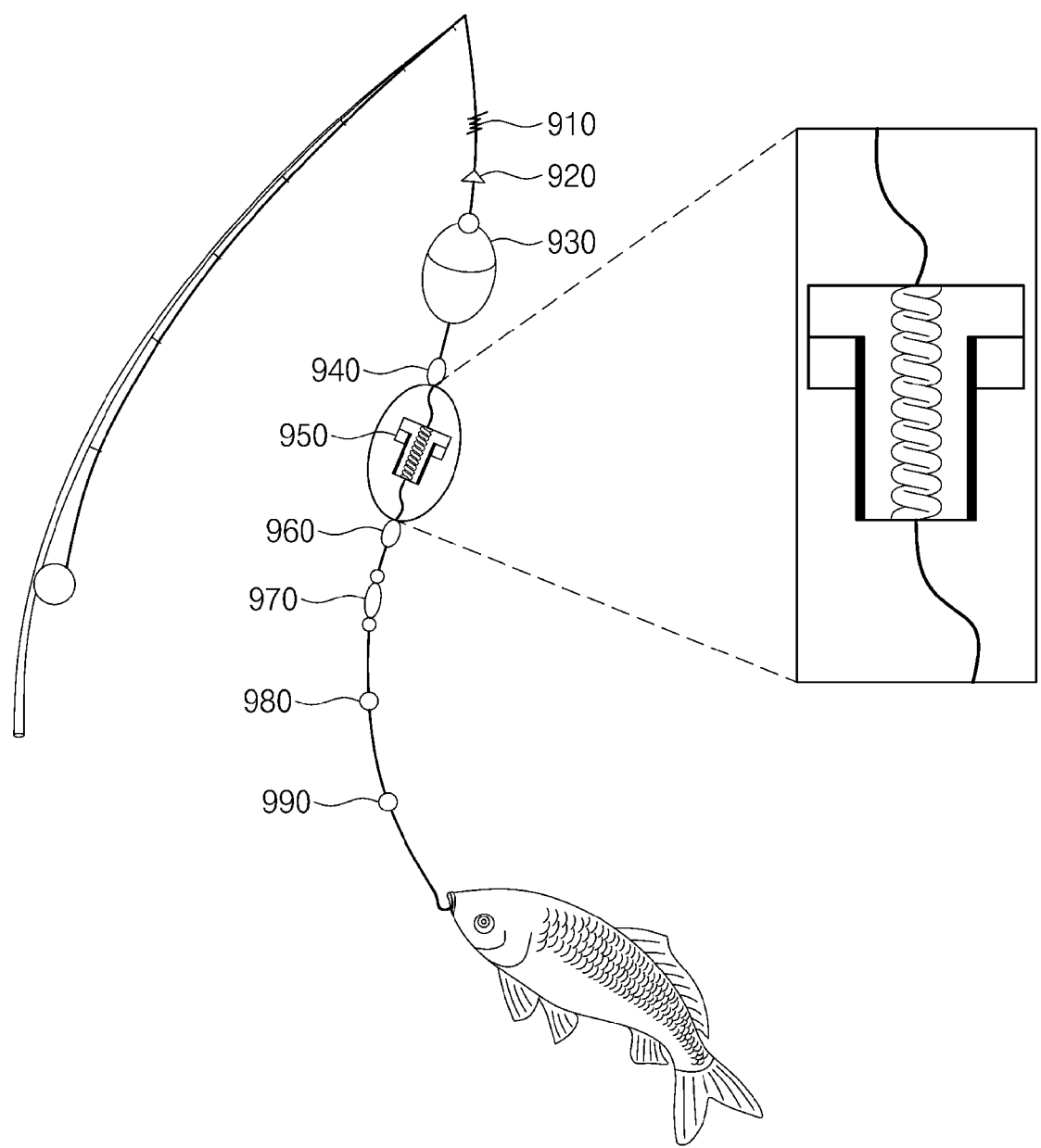

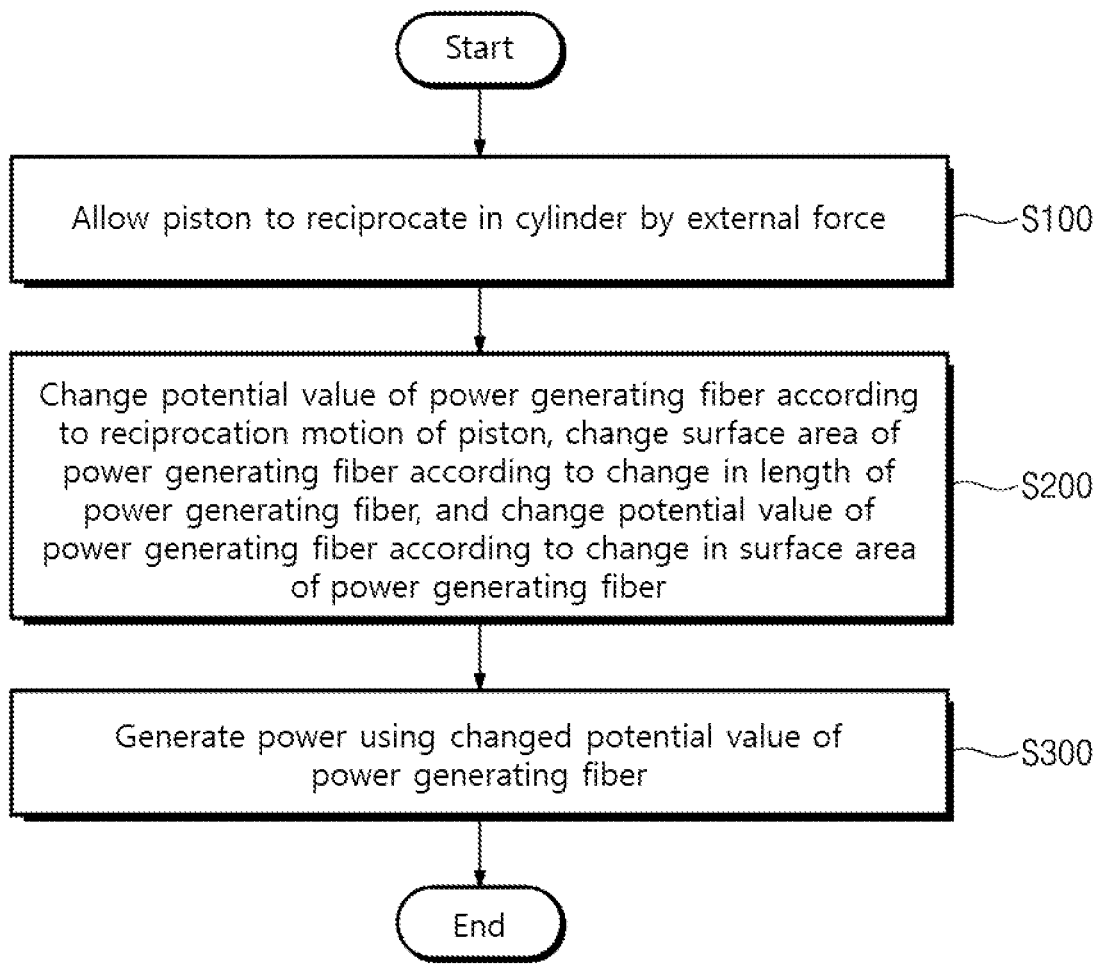
[Fig. 28]

[Fig. 29]
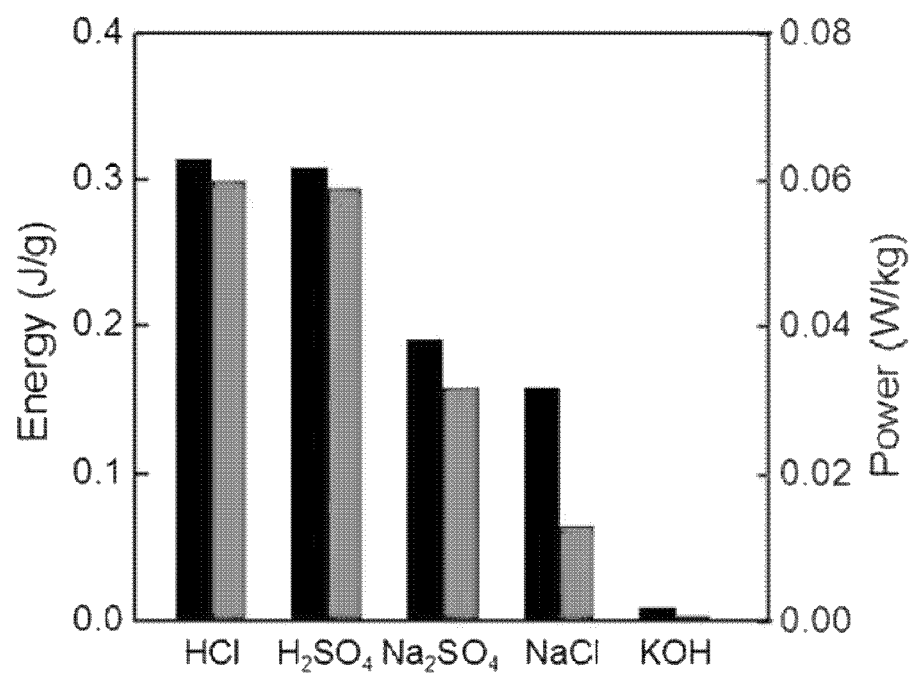

ELECTRICITY GENERATING MODULE AND ELECTRICITY GENERATING METHOD

CROSS REFERENCE TO RELATED APPLICATIONS

This application is a National Stage of International Application No. PCT/KR2019/018811 filed Dec. 31, 2019, claiming priority based on Korean Patent Application No. 10-2018-0173257 filed Dec. 31, 2018.

TECHNICAL FIELD

The present disclosure relates to an electricity generating module and an electricity generating method, and more particularly, to an electricity generating module and an electricity generating method for generating power by using a change in the potential value of power generating fiber.

BACKGROUND ART

Research has been conducted on life-saving equipment having various functions such as LEDs, electric heaters, and GPS location transmitters in order to increase the probability of survival of the victims in the event of a marine emergency. As an example, there has been disclosed a life jacket in Korea Patent Registration No. 10-1930170 (Application No. 10-2017-0113742, Applicant: Chung-Hyun PARK), which includes a jacket part that expands through the injection of gas into a gas expansion space formed therein, and a mask part formed to surround a face of a user, wherein the jacket part has an air storage space isolated from the gas expansion space therein, and the mask part includes a frame that is connected to the air storage space through an air connection line so as to receive air in the air storage space, is formed integrally with the jacket part, has a shape changed according to a shape of the jacket part, and is formed of an elastic material to be kept on the jacket part.

However, in life-saving equipment to which various electronic devices are added, a battery is inevitably included in order to drive the devices. The battery has a fixed capacity to store electricity, so when the battery is discharged, the battery is required to be charged. In addition, the battery has a finite lifespan so that it is necessary to periodically replace the battery. Accordingly, studies are being made to solve the above-described problems.

DOCUMENTS OF RELATED ART

Patent Document

Korea Patent Registration No. 10-1930170

DISCLOSURE

Technical Problem

One object of the present disclosure is to provide an electricity generating module and an electricity generating method that can self-generate power.

Another object of the present disclosure is to provide an electricity generating module and an electricity generating method that are applicable to various offshore rescue equipment.

Still another object of the present disclosure is to provide an electricity generating module and an electricity generating method that can improve the survival probability of a victim.

The technical problems to be solved by the present disclosure are not limited to the above.

Technical Solution

To achieve the objects, the present disclosure provides an electricity generating module.

According to an embodiment, there is provided an electricity generating module which includes a cylinder; a piston reciprocating inside the cylinder; and a power generating fiber having one end fixed to the piston and an opposite end fixed to the cylinder, in which a length of the power generating fiber varies as the piston reciprocates, wherein a potential value of the power generating fiber varies as the length of the power generating fiber varies, and electricity is generated by using the varied potential value of the power generating fiber.

According to an embodiment, the piston may include a piston head having a diameter corresponding to an inner diameter of the cylinder; and a piston rod connected to the piston head and extending in a longitudinal direction of the cylinder, wherein the one end of the power generating fiber is fixed to the piston head, and the opposite end of the power generating fiber is fixed to a bottom surface of an inside of the cylinder.

According to an embodiment, the power generating fiber may include a plurality of power generating fibers, one ends of the plurality of power generating fibers are fixed to an edge of the piston head, and the electricity generating module further includes an elastic structure connected to a central portion of the piston head to apply an elastic force in a direction in which the piston is inserted into the cylinder.

According to an embodiment, the electricity generating module may further include a first buoyancy structure fixedly connected to the piston; and a second buoyancy structure fixedly connected to the cylinder and having smaller buoyancy than the first buoyancy structure.

According to an embodiment, the electricity generating module may be provided in a fluid environment, a difference in motion may be generated between the first buoyancy structure and the second buoyancy structure by a movement of a fluid, and the piston may reciprocate in the cylinder by the difference in motion between the first buoyancy structure and second buoyancy structure.

According to an embodiment, the first buoyancy structure may include a life jacket, the life jacket may include a signal unit including at least one of a GPS and an LED, and the energy generated by the electricity generating module may be supplied to the signal unit.

According to an embodiment, the electricity generating module may be provided in a fluid environment and may further include a first buoyancy structure fixedly connected to the piston and floating on the fluid, the cylinder may be fixedly connected to a wearer of the first buoyancy structure, and the piston may reciprocate inside the cylinder by an external force of the wearer.

According to an embodiment, a surface area of the power generating fiber may vary as the length of the power generating fiber varies, and the potential value of the power generating fiber may vary as the surface area of the electric power generating fiber varies.

According to an embodiment, the electricity generating module may be provided in a fluid environment, and the power generating fiber may have a twisted structure. When the length of the power generating fiber is increased, a number of twists of the power generating fiber may be decreased so that the surface area of the power generating fiber is increased and a contact area with the fluid is increased. When the length of the power generating fiber is reduced, a number of twists of the power generating fiber may be increased so that the surface area of the power generating fiber is reduced and the contact area with the fluid is reduced.

According to an embodiment, the fluid may include seawater.

According to an embodiment, the cylinder may include a plurality of fluid inlets that allow communication between an outside and an inside of the cylinder.

According to an embodiment, the power generating fiber may include twisted carbon nanotubes (CNTs) arranged in one direction.

To achieve the objects, the present disclosure provides an electricity generating method.

According to an embodiment, there is provided an electricity generating method by an electricity generating module which includes a cylinder, a piston reciprocating inside the cylinder, and a power generating fiber having one end fixed to the piston and an opposite end fixed to the cylinder, wherein the electricity generating includes allowing the piston to reciprocate in the cylinder by an external force; changing a length of the power generating fiber according to reciprocation of the piston, changing a surface area of the power generating fiber according to a change in the length of the power generating fiber, and changing a potential value according to a change in the surface area of the power generating fiber; and generating power by using the changed potential value of the power generating fiber.

According to an embodiment, the electricity generating module may be provided in a fluid environment, and the power generating fiber may have a twisted structure, wherein, in the changing of the potential value, when the length of the power generating fiber is increased, a number of twists of the power generating fiber is decreased so that the surface area of the power generating fiber is increased and a contact area with the fluid is increased, and when the length of the power generating fiber is reduced, a number of twists of the power generating fiber is increased so that the surface area of the power generating fiber is reduced and the contact area with the fluid is reduced.

Advantageous Effects

According to the embodiment of the present disclosure, an electricity generating module may include a cylinder, a piston reciprocating inside the cylinder, and a power generating fiber having one end fixed to the piston and an opposite end fixed to the cylinder, wherein a length, of the power generating fiber varies as the piston reciprocates, wherein a potential value of the power generating fiber varies as the length of the power generating fiber varies, and electricity is generated by using the varied potential value of the power generating fiber.

In addition, the electricity generating module may semi-permanently generate power by reciprocating the piston by seawater. Accordingly, by semi-permanently supplying power to electronic devices such as GPS and LED included in the life jacket, it is possible to improve the survival probability of the victims.

DESCRIPTION OF DRAWINGS

FIG. 1 is an exploded perspective view of an electricity generating module according to a first embodiment of the present disclosure.

FIG. 2 is a combined perspective view of the electricity generating module according to the first embodiment of the present disclosure.

FIG. 3 is a perspective view of a cylinder included in the electricity generating module according to the first embodiment of the present disclosure.

FIG. 4 is a cross-sectional view taken along line T1-T1' of FIG. 2.

FIG. 5 is a cross-sectional view taken along line T2-T2' of FIG. 2.

FIGS. 6 to 9 are views illustrating an operation of the electricity generating module according to the first embodiment of the present disclosure.

FIGS. 10 to 15 are views illustrating specific application examples of the electricity generating module according to the first embodiment of the present disclosure.

FIGS. 16 and 17 are views illustrating an electricity generating module according to a first modified example of the first embodiment of the present disclosure.

FIGS. 18 to 20 are views illustrating an electricity generating module according to a second modified example of the first embodiment of the present disclosure.

FIGS. 21 and 22 are views illustrating an electricity generating module according to a third modified example of the first embodiment of the present disclosure.

FIGS. 23 and 24 are views illustrating an electricity generating module according to a second embodiment of the present disclosure.

FIGS. 25 and 26 are views illustrating an electricity generating module according to a modified example of the second embodiment of the present disclosure.

FIG. 27 is a view illustrating an electricity generating module according to a third embodiment of the present disclosure.

FIG. 28 is a flowchart illustrating a power generation method according to an embodiment of the present disclosure.

FIG. 29 is a graph illustrating electrical characteristics of the electricity generating module according to the experimental example of the present disclosure in various electrolyte environments.

BEST MODE

Mode for Invention

Hereinafter, preferable embodiments of the present disclosure will be described in detail with reference to accompanying drawings. However, the spirit and technical scope of the present disclosure is not limited to the embodiments and may be modified variously in many different forms. Rather, the embodiments introduced herein are provided so that the disclosed contents may be thorough and complete, and the spirit of the present disclosure may be sufficiently conveyed to those skilled in the art.

In the present specification, when it is mentioned that a certain component is on another component, it means that the component may be formed directly on another component or that a third component may be interposed therebetween. In addition, the thicknesses of the lines and the sizes of the components shown in the drawings may be exaggerated for clarity and convenience of explanation.

In addition, in various embodiments of the present specification, terms, such as "first", "second", "third", and the like, are used to describe various components, but these components should not be limited by the terms. These terms are only used to distinguish one component from another component. Accordingly, what is referred to as a first component in one embodiment may be referred to as a second component in another embodiment. Each embodiment described and illustrated herein also includes its complementary embodiment. In the present disclosure, the term "and/or" indicates at least one of components listed before and after.

In the present disclosure, the terms of a singular form may include plural forms unless the context clearly indicates otherwise. In addition, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. In the present disclosure, "connection" is used to include both indirectly and direct connection of a plurality of components.

In addition, a detailed description of well-known configurations or functions will be ruled out in order not to unnecessarily obscure the gist of the present disclosure.

In addition, in the following description of the present disclosure, the word 'twisted number' may represent the number of twists. That is, a large number of twists may mean a high degree of twist. To the contrary, a small number of twists may mean a low degree of twist.

FIG. 1 is an exploded perspective view of an electricity generating module according to a first embodiment of the present disclosure. FIG. 2 is a combined perspective view of the electricity generating module according to the first embodiment of the present disclosure. FIG. 3 is a perspective view of a cylinder included in the electricity generating module according to the first embodiment of the present disclosure. FIG. 4 is a cross-sectional view taken along line T1-T1' of FIG. 2. FIG. 5 is a cross-sectional view taken along line T2-T2' of FIG. 2. FIGS. 6 to 9 are views illustrating an operation of the electricity generating module according to the first embodiment of the present disclosure. FIGS. 10 to 15 are views illustrating specific application examples of the electricity generating module according to the first embodiment of the present disclosure.

Referring to FIGS. 1 and 2, an electricity generating module EM according to the first embodiment of the present disclosure may include a cylinder 100, a piston 200, a power generating fiber 300, a counter electrode 400, a circuit unit 500, and an elastic structure 600. Hereinafter, each configuration will be described.

Referring to FIG. 3, the cylinder 100 may have an empty space therein. In the empty space, the piston 200, the power generating fiber 300, the counter electrode 400, and the circuit unit 500 to be described later may be disposed. According to an embodiment, the cylinder 100 may have a cylindrical shape. Unlike this case, according to another embodiment, the cylinder 100 may have various shapes. That is, the shape of the cylinder 100 is not limited.

The cylinder 100 may include a plurality of fluid inlets 100h. The fluid inlet 100h may allow the communication between an outside and an inside of the cylinder. Accordingly, when the cylinder 100 is provided in a fluid environment, a fluid may flow into the cylinder 100 through the fluid inlet 100h.

According to an embodiment, the fluid may include sea water. That is, the electricity generating module EM according to the first embodiment may be provided in an ocean environment. In this case, the electricity generating module EM according to the first embodiment may use the fluid (e.g., seawater) as an electrolyte.

Referring to FIGS. 4 and 5, the piston 200 may include a piston rod 210 and a piston head 220. The piston head 220 may be disposed inside the cylinder 100. According to an embodiment, the piston head 220 may have a disk shape having a diameter corresponding to the inner diameter of the cylinder 100. Unlike this case, the piston rod 210 may have a shape extending in the longitudinal direction of the cylinder 100, and one end may be connected to the piston head 220. According to an embodiment, the piston rod 210 may be disposed to penetrate the outside and the inside of the cylinder 100 in the longitudinal direction of the cylinder 100. The piston 200 may reciprocate in the cylinder 100 by an external force. The description of the reciprocating motion of the piston 200 by an external force will be described later.

The power generating fiber 300 may be disposed in the cylinder 100. According to an embodiment, the power generating fiber 300 may be disposed between the piston 200 and the cylinder 100. In more detail, one end of the power generating fiber 300 may be fixed to the piston 200. Meanwhile, an opposite end of the power generating fiber 300 may be fixed to the cylinder 100.

According to an embodiment, the power generating fiber 300 may be provided in plural. The plurality of power generating fibers 300 may be disposed along an edge of the piston head 210. That is, the ends of the plurality of power generating fibers 300 may be fixed to the edge of the piston head 210.

The power generating fiber 300 may have a twisted structure and elasticity. For example, the power generating fiber 300 may include a carbon nanotube (CNT) fiber. In more detail, the power generating fiber 300 may be manufactured by twisting a carbon nanotube (CNT) sheet. In addition, the carbon nanotube sheet may be manufactured from a carbon nanotube (CNT) forest. That is, after the carbon nanotube sheet is manufactured from the carbon nanotube forest, the carbon nanotube sheet may be twisted to manufacture the power generating fiber 300. Accordingly, the power generating fiber 300 may be formed by twisting a plurality of carbon nanotubes arranged in one direction.

The length of the power generating fiber 300 may be changed according to the reciprocating motion of the piston 200. According to an embodiment, the length of the power generating fiber 300 may increase or decrease according to the reciprocating motion of the piston 200. In more detail, as shown in FIG. 6, when the piston 200 is moved in a direction away from a lower surface of the cylinder 100, the length of the power generating fiber 300 may increase. Unlike this case, when the piston 200 moves in a direction closer to the lower surface of the cylinder 100 as shown in FIG. 8, the length of the power generating fiber 300 may be reduced.

According to an embodiment, when the length of the power generating fiber 300 is changed, the surface area of the power generating fiber 300 may be changed. Accordingly, the potential value of the power generating fiber 300 may be changed.

In more detail, as shown in FIG. 7, when the length of the power generating fiber 300 is increased, the number of twists of the power generating fiber 300 may be reduced. That is, when the length of the power generating fiber 300 is increased, the twisted structure of the power generating fiber 300 may be released. Accordingly, the surface area exposed to the outside of the power generating fiber 300 increases, thereby increasing a contact area with the fluid. As described above, as the fluid (e.g., seawater) is used as an electrolyte, the electric potential value of the power generating fiber 300 may be changed.

Unlike this case, as shown in FIG. 9, when the length of the power generating fiber 300 is reduced, the number of twists of the power generating fiber 300 may be increased. That is, when the length of the power generating fiber 300 is reduced, the power generating fiber 300 may be twisted further. Accordingly, as the surface area of the power generating fiber 300 exposed to the outside is reduced, the contact area with the fluid is reduced, so that the potential value of the power generating fiber 300 may be changed.

The counter electrode 400 may be disposed in the cylinder 100. According to an embodiment, a change in the potential value of the power generating fiber 300 may be measured through the counter electrode 400. According to an embodiment, the counter electrode 400 may have a cylindrical shape in which a hollow is formed. Unlike this case, according to another embodiment, the counter electrode 400 may have various shapes. That is, the shape of the counter electrode 400 is not limited.

The circuit unit 500 may be disposed in the cylinder 100. According to an embodiment, the circuit unit 500 may be disposed in the cylinder 100 to be surrounded by the plurality of power generating fibers 300. As described above, the circuit unit 500 may rectify and amplify power according to the changed potential value of the power generating fiber 300. For example, a current value generated by the power generating fiber 300 may be relatively high, but a voltage value may be relatively low. Accordingly, the amplification of the voltage value may be performed in the circuit unit 500 so that it can be easily used in an external electronic device. In addition, according to an embodiment, the circuit unit 500 may store the generated power.

The elastic structure 600 may be disposed in the cylinder 100 to penetrate the hollow of the counter electrode 400. In addition, the elastic structure 600 may connect the piston 200 and the circuit unit 500. According to an embodiment, one end of the elastic structure 600 may be connected to the piston head 220. In more detail, one end of the elastic structure 600 may be connected to the central portion of the piston head 220. Meanwhile, the opposite end of the elastic structure 600 may be connected to the circuit unit 500.

The elastic structure 600 may apply an elastic force in a direction in which the piston 200 is inserted into the cylinder 100. Accordingly, the elastic structure 600 may prevent rapid movement of the piston 200, thereby preventing a sudden change in the length of the power generating fiber 300. In addition, a change in the length of the power generating fiber 300 may occur more easily.

The electricity generating module EM according to the first embodiment may further include a first electrode 710 and a second electrode 720. According to an embodiment, the first electrode 710 and the second electrode 720 may be connected to the circuit unit 500. Accordingly, the power stored in the circuit unit 500 may be used through the first electrode 710 and the second electrode 720.

In addition, the electricity generating module EM according to the first embodiment may further include a first buoyancy structure (not shown) and a second buoyancy structure (not shown). According to an embodiment, the first buoyancy structure and the second buoyancy structure may be objects that float on the fluid (e.g., seawater). In addition, the second buoyancy structure may have a smaller buoyancy than the first buoyancy structure. For a specific example, the first buoyancy structure may be a life jacket. The life jacket may include a signal unit including GPS and LED. Meanwhile, the second buoyancy structure may be a wearer wearing the first buoyancy structure. Alternatively, the second buoyancy structure may be a wearable device. For example, the wearable device may be a marine suit.

According to an embodiment, the first buoyancy structure may be fixedly connected to the piston rod 210 included in the piston 200. Unlike this case, the second buoyancy structure may be fixedly connected to the cylinder 100. In more detail, while the cylinder 100 is attached to the wearer of the life jacket, the piston rod 210 may be fixedly connected to the life jacket. For example, the cylinder 100 may be attached to the wearer's back, as shown in FIG. 10. Unlike this case, for another example, the cylinder 100 may be attached to the wearer's arm, as shown in FIG. 11. The attachment portion of the cylinder 100 is not limited.

When the electricity generating module EM according to the first embodiment is provided in the fluid (e.g., seawater) environment, a difference in motion between the first buoyancy structure and the second buoyancy structure may occur due to the movement of the fluid. Accordingly, the piston 200 may reciprocate in the cylinder 100.

That is, when the wearer of the life jacket falls into the sea, a difference in motion may occur between the life jacket and the wearer due to waves. In this case, the life jacket may be fixedly connected to the piston 200, and the wearer may be fixedly connected to the cylinder 100, so that the piston 200 reciprocates in the cylinder 100. In addition, as described above, when the piston 200 reciprocates, power may be generated through the power generating fiber 300. The generated power may be supplied to a signal unit included in the life jacket. Accordingly, electronic devices such as GPS and LED mounted on the life jacket may be driven.

As a result, the electricity generating module according to the first embodiment of the present disclosure generates power by itself by waves, so that the lifespan of electronic devices such as GPS and LEDs included in the life jacket may be significantly improved. Accordingly, the survival probability of the victims can be improved.

Unlike this case, according to another embodiment, the piston 200 may reciprocate in the cylinder 100 by the external force of the wearer. That is, when the wearer holds and shakes the cylinder 100, the piston 200 may reciprocate in the cylinder 100. Accordingly, power may be generated through the power generating fiber 300, and electronic devices such as GPS and LEDs mounted on the life jacket may be driven using the generated power.

For this reason, when the electricity generating module according to the first embodiment of the present disclosure cannot generate power by waves, the wearer may generate power by himself, so that electronic devices such as GPS and LEDs included in the life jacket may be improved.

As described above, the electricity generating module according to the first embodiment of the present disclosure has been described. Hereinafter, an electricity generating module according to a modified example of the first embodiment of the present disclosure will be described.

FIGS. 16 and 17 are views illustrating an electricity generating module according to a first modified example of the first embodiment of the present disclosure.

Referring to FIGS. 16 and 17, the electricity generating module according to the first modified example of the first embodiment of the present disclosure may include a cylinder 100, a piston 200, a power generating fiber 300, a counter electrode 400, a circuit unit 500, a first electrode 710, and a second electrode 720. Each component included in the electricity generating module according to the first modified example of the first embodiment may be the same as each component of the electricity generating module according to the first embodiment described with reference to FIGS. 1 to 15. Accordingly, detailed descriptions will be omitted.

However, the cylinder 100 included in the electricity generating module according to the first modified example of the first embodiment may be divided into an upper region and a lower region. According to an embodiment, a plurality of fluid inlets 100h may be formed in the upper region of the cylinder 100. The plurality of fluid inlets 100h may allow communication between an outside and an inside of the cylinder.

The piston 200, the power generating fiber 300, and the counter electrode 400 may be disposed in the upper region of the cylinder 100. According to an embodiment, the power generating fiber 300 may have one end fixed to the piston 200 and an opposite end fixed to the counter electrode 400. Accordingly, the opposite end of the power generating fiber 300 may be fixed to the cylinder 100 through the counter electrode 400. Meanwhile, the circuit unit 500, the first electrode 710, and the second electrode 720 may be disposed in the lower region of the cylinder 100.

That is, a change in potential value may be occur in the upper region of the cylinder 100 through the power generating fiber 300, and the caused change in the potential value and rectification, amplification, and storage by the circuit unit 500 may be performed in the lower region of the cylinder 100.

FIGS. 18 to 20 are views illustrating an electricity generating module according to a second modified example of the first embodiment of the present disclosure.

Referring to FIGS. 18 to 20, the electricity generating module according to the second modified example of the first embodiment of the present disclosure may include a first cylinder 100a, a second cylinder 100b, a piston rod 210, a piston head 220, a power generating fiber 300, a counter electrode 400, a circuit unit 500, a first electrode 710, and a second electrode 720. The piston rod 210, the piston head 220, the power generating fiber 300, the counter electrode 400, the circuit unit 500, the first electrode 710 and the second electrode 720 included in the electricity generating module according to the first modified example of the first embodiment may be the same as those of the electricity generating module according to the first embodiment described with reference to FIGS. 1 to 15. Accordingly, the detailed descriptions will be omitted.

The piston rod 210, the piston head 220, the power generating fiber 300, and the counter electrode 400 may be disposed in the first cylinder 100a. According to an embodiment, a plurality of fluid inlets 100h may be formed in the first cylinder 100a. The plurality of fluid inlets 100h may allow communication between an outside and an inside of the cylinder 100. According to an embodiment, the power generating fiber 300 may have one end fixed to the piston 200 and an opposite end fixed to the counter electrode 400. Accordingly, the opposite end of the power generating fiber 300 may be fixed to the cylinder 100 through the counter electrode 400.

The second cylinder 100b may be coupled to the first cylinder 100a. According to an embodiment, the first cylinder 100a and the second cylinder 100b may be combined in a stacked structure, as shown in FIG. 18. The circuit part 500, the first electrode 710, and the second electrode 720 may be disposed in the second cylinder 100b.

That is, a change in potential value may be occur in the upper region of the cylinder 100 through the power generating fiber 300, and the caused change in the potential value and rectification, amplification, and storage by the circuit unit 500 may be performed in the lower region of the second cylinder 100b.

FIGS. 21 and 22 are views illustrating an electricity generating module according to a third modified example of the first embodiment of the present disclosure.

Referring to FIGS. 21 and 22, an electricity generating module according to a third modified example of the first embodiment of the present disclosure may include a cylinder 100, a piston 200, a power generating fiber 300, a counter electrode 400, a circuit unit 500, a first electrode 710, and a second electrode 720. Each component included in the electricity generating module according to the first modified example of the first embodiment may be the same as each component of the electricity generating module according to the first modified example of the first embodiment described with reference to FIGS. 16 and 17. Accordingly, detailed descriptions will be omitted. However, the cylinder 100 included in the electricity generating module according to the third modified example of the first embodiment may have a dome shape having a flat lower portion and a half-sphere upper portion.

As described above, the electricity generating module according to the first embodiment and the modified examples of the first embodiment of the present disclosure has been described. Hereinafter, an electricity generating module according to a second embodiment of the present disclosure will be described.

FIGS. 23 and 24 are views illustrating an electricity generating module according to a second embodiment of the present disclosure.

Referring to FIGS. 23 and 24, the electricity generating module according to the second embodiment of the present disclosure may include a cylinder 810, a weight 820, a power generating fiber 830, a gas supply 840, and a balloon 850, a light 860, a piston 870, and a cap 880. The electricity generating module according to the second embodiment may also be used with a life jacket, like the electricity generating module according to the first embodiment described above. Hereinafter, each component will be described.

The cylinder 100 may have an empty space formed therein. In the empty space, the power generating fiber 830, the gas supply 840, the balloon 850, the light 860, and a piston 870 may be disposed.

According to an embodiment, the cylinder 100 may be divided into an upper region and a lower region. In addition, the upper region and the lower region of the cylinder 100 may be divided by a partition plate (not shown). In the upper area, the balloon 850 and the light 860 may be disposed. Meanwhile, the power generating fiber 830, the gas supply 840, and the piston 870 may be disposed in the lower region. The weight 820 and the cap 880 may be coupled to a lower region and an upper region of the cylinder 100, respectively.

According to an embodiment, the cylinder 810 may include a plurality of fluid inlets (not shown). The fluid inlet may allow communication between an outside and an inside of the cylinder. Accordingly, when the cylinder is provided in a fluid environment, a fluid may flow into the cylinder 810 through the fluid inlet.

According to an embodiment, the fluid may include sea water. That is, the electricity generating module according to the second embodiment may be provided in an ocean environment. In this case, the electricity generating module according to the second embodiment may use the fluid (e.g., seawater) as an electrolyte.

As described above, the balloon 850 and the light 860 may be disposed in the upper region of the cylinder 810. According to an embodiment, the light 860 may be provided while being coupled to the balloon 850. For example, the light 860 may include an LED. The balloon 850 may receive gas from the gas supply 840. In this case, while the cap 880 is separated from the cylinder 810, the balloon 850 may expand.

The piston 870 is disposed in the lower region of the cylinder 810 and may be connected to the weight 820 through a wire. According to an embodiment, the piston 870 may reciprocate in the cylinder 810 according to the movement of the weight 820. The weight 820 may be moved by an external force. In detail, the weight 820 may be moved by a wave. Alternatively, the weight 820 may be moved by an external force of the wearer of a life jacket.

The power generating fiber 830 may be disposed in the lower region of the cylinder. According to an embodiment, the power generating fiber 830 may be disposed between the piston 870 and the partition plate (not shown) that divides the upper region and the lower region of the cylinder 810. In more detail, one end of the power generating fiber 830 may be fixed to the partition plate (not shown). Meanwhile, an opposite end of the power generating fiber 830 may be fixed to the piston 870.

The length of the power generating fiber 830 may be changed according to the reciprocating motion of the piston 870. According to an embodiment, the length of the power generating fiber 830 may increase or decrease according to the reciprocating motion of the piston 870. In this case, the surface area of the power generating fiber 830 may be changed. Accordingly, the potential value of the power generating fiber 830 may be changed. As a result, electric power may be produced using the changed potential value. The generated power may be supplied to the light 860.

In more detail, when the length of the power generating fiber 830 is increased, the number of twists of the power generating fiber 830 may be reduced. That is, when the length of the power generating fiber 830 is increased, the twisted structure of the power generating fiber 830 may be released. Accordingly, the surface area of the power generating fiber 830 exposed to an outside may increase, thereby increasing a contact area with the fluid. As described above, as the fluid (e.g., seawater) is used as an electrolyte, the potential value of the power generating fiber 830 may be changed.

Unlike this case, when the length of the power generating fiber 830 is reduced, the number of twists of the power generating fiber 830 may be increased. That is, when the length of the power generating fiber 830 is reduced, the power generating fiber 830 may be twisted further. Accordingly, the surface area of the power generating fiber 830 exposed to an outside may be reduced, so that a contact area with the fluid is reduced, thereby changing the potential value of the power generating fiber 830.

FIGS. 25 and 26 are views illustrating an electricity generating module according to a modified example of the second embodiment of the present disclosure.

Referring to FIGS. 25 and 26, the electricity generating module according to the modified example of the second embodiment of the present disclosure may include a cylinder 810, a weight 820, a power generating fiber 830, a gas supply 840, a balloon 850, a light 860, a piston 870, and a cap 880. Each component included in the electricity generating module according to the modified example of the second embodiment may be the same as each component of the electricity generating module according to the second embodiment described with reference to FIGS. 23 and 24. Accordingly, the detailed descriptions will be omitted.

However, in the electricity generating module according to the modified example of the second embodiment, the gas supply 840, the balloon 850, and the light 860 may be disposed in the cylinder 810. In addition, the weight 820 may have an empty space formed therein, and the piston 870 and the power generating fiber 830 may be disposed in the empty space of the weight 820.

One end of the power generating fiber 830 may be fixed to the piston 870 and an opposite end may be fixed to the weight 820. According to an embodiment, the piston 870 may reciprocate in the weight 820.

As described above, the electricity generating modules according to the second embodiment of the present disclosure and the modified example of the second embodiment have been described. Hereinafter, an electricity generating module according to a third embodiment of the present disclosure will be described.

FIG. 27 is a view illustrating an electricity generating module according to a third embodiment of the present disclosure.

Referring to FIG. 27, the electricity generating module according to the third embodiment of the present disclosure may include a float stopper cotton yarn 910, a hemispheric ball 920, a hole float 930, a first buffer rubber 940, a power generating fiber 950, a underwater float 960, a second buffer rubber 970, a pulley 980, a sinker 990, and a fishing hook (not shown). Hereinafter, each component will be described.

The float stopper cotton yarn 910 may be used for water depth control. The hemispheric ball 920 may perform a function of allowing the hole float 930, which will be described later, to be hooked to the float stopper cotton yarn 910. The hole float 930 may be used to grasp a fish and ride the waves. The first buffer rubber 940, which is an O-type buffer rubber, may reduce the impact of underwater and hole floats. The underwater float 960 may attenuate the buoyancy of the hole float 930 and stabilize a lower fishing gear. The second buffer rubber 970, which is a V-type buffer rubber, may reduce the impact of underwater floats and pulleys and protect knots. Unlike the pulley of smooth bidirectional rotation, the pulley 980 may not rotate and be used as a shock leader. The sinker 990 may reduce the difference in buoyancy between the hole float and the underwater float, and may produce an ideal angle of the shock leader. The electric potential of the power generating fiber 950 may be changed according to a change in length, and electric power may be generated using the changed potential value of the power generating fiber 950.

As described above, the electricity generating modules according to the embodiment and modified example of the present disclosure have been described. Hereinafter, a power generating method according to an embodiment of the present disclosure will be described.

FIG. 28 is a flowchart illustrating a power generation method according to an embodiment of the present disclosure.

Referring to FIG. 28, the power generating method according to the embodiment may include operation S100 of allowing the piston to reciprocate in the cylinder, operation S200 of changing the potential value of the power generating fiber, and operation S300 of generating power using the changed potential value. Hereinafter, each operation will be described in detail. In addition, in describing the power generation method according to the embodiment, the electricity generating module according to the first embodiment described with reference to FIGS. 1 to 15 will be described as an example.

In operation S100, the piston 200 may reciprocate in the cylinder 100 by an external force. According to an embodiment, the piston 200 may reciprocate in the cylinder 100 by a difference in motion between the first buoyancy structure (e.g., a life jacket) and the second buoyancy structure (e.g., a life jacket wearer). For example, the first buoyancy structure and the second buoyancy structure may have a difference in motion due to a wave.

In operation S200, the length of the power generating fiber 300 may be changed according to the reciprocating motion of the piston 200. According to an embodiment, the length of the power generating fiber 300 may increase or decrease according to the reciprocating motion of the piston 200.

When the length of the power generating fiber 300 is changed, the surface area of the power generating fiber 300 may be changed. Accordingly, the potential value of the power generating fiber 300 may be changed.

In more detail, when the length of the power generating fiber 300 is increased, the number of twists of the power generating fiber 300 may be reduced. That is, when the length of the power generating fiber 300 is increased, the twisted structure of the power generating fiber 300 may be released. Accordingly, the surface area of the power generating fiber 300 exposed to an outside may increase, thereby increasing the contact area with the fluid. As described above, as the fluid (e.g., seawater) is used as an electrolyte, the potential value of the power generating fiber 300 may be changed.

Unlike this case, when the length of the power generating fiber 300 is reduced, the number of twists of the power generating fiber 300 may be increased. That is, when the length of the power generating fiber 300 is reduced, the power generating fiber 300 may be twisted further. Accordingly, the surface area exposed to the outside of the power generating fiber 300 may be reduced, so that the contact area with the fluid is reduced, thereby changing the potential value of the power generating fiber 300. In operation S300, electric power may be generated by using the changed potential value of the electric power generating fiber 300.

As described above, the power generating method according to an embodiment of the present disclosure has been described. Hereinafter, specific experimental examples and feature evaluation results of the electricity generating module according to an embodiment of the present disclosure will be described.

Manufacturing of Electricity Generating Module According to Experimental Example The CNT sheet was prepared. An opposite end of the prepared CNT sheet was fixed, and a weight for applying the pressure of 54 MPa was attached to one end of the prepared CNT. Thereafter, one end of the CNT sheet was twisted at 1666 turns/m to prepare a twist CNT fiber. Then, one end of the CNT sheet was twisted at 1666 turns/m to prepare a twist CNT fiber.

In addition, a non-twist CNT fiber was prepared by twisting one end of the twist CNT fiber at 1666 turns/m in the direction opposite to the direction in which the CNT sheet was twisted.

The twist CNT fiber was used as a working electrode and the non-twist CNT fiber was used as a counter electrode such that the power generating module according to an experimental example was prepared.

FIG. 29 is a graph illustrating electrical characteristics of the electricity generating module according to the experimental example of the present disclosure in various electrolyte environments.

Referring to FIG. 29, the electricity generating module according to the experimental example was prepared, and systems for charging electric energy, which use HCl electrolyte, $H_2SO_4$ electrolyte, $Na_2SO_4$ electrolyte, NaCl electrolyte, and KOH electrolyte, respectively, were prepared, of which each energy (J/g) and power (W/kg) were measured and shown.

As shown in FIG. 29, it was confirmed that the electricity generating module according to the experimental example generates energy in all of the HCl, $H_2SO_4$, $Na_2SO_4$, NaCl and KOH electrolytes. Accordingly, it may be understood that the electricity generating module according to the experimental example can be used in a seawater environment.

As described above, although the present disclosure has been described in detail using preferred embodiments, the scope of the present disclosure is not limited to specific embodiments, and should be interpreted by the appended claims. In addition, it should be understood that various modifications and alterations can be made from the disclosures above by a person having ordinary skill in the art, without departing from the scope of the present disclosure.

INDUSTRIAL APPLICABILITY

The electricity generating module and the electricity generating method according to the embodiments of the present disclosure may be used as an offshore rescue device that increases the survival probability of a victim.

DESCRIPTION OF REFERENCE NUMERAL

100: Cylinder
200: Piston
300: Power generating fiber
400: Counter electrode
500: Circuit unit
600: Elastic structure
710: First electrode
720: Second electrode

The invention claimed is:

1. An electricity generating module comprising:
   a cylinder;
   a piston reciprocating inside the cylinder; and
   a power generating fiber having one end fixed to the piston and an opposite end fixed to the cylinder, in which a length of the power generating fiber varies as the piston reciprocates,
   wherein a potential value of the power generating fiber varies as the length of the power generating fiber varies, and electricity is generated by using the varied potential value of the power generating fiber,
   wherein the cylinder includes a plurality of fluid inlets configured to communicate a fluid between an outside and an inside of the cylinder during a reciprocating motion of the piston, and
   wherein the fluid includes seawater and the reciprocating motion of the piston is generated by the fluid and the fluid is used as an electrolyte to generate a potential value that varies based on the power generating fiber.

2. The electricity generating module of claim 1, wherein the piston includes:

a piston head having a diameter corresponding to an inner diameter of the cylinder; and a piston rod connected to the piston head and extending in a longitudinal direction of the cylinder, wherein the one end of the power generating fiber is fixed to the piston head, and the opposite end of the power generating fiber is fixed to a bottom surface of the inside of the cylinder.

3. The electricity generating module of claim 2, wherein the power generating fiber includes a plurality of power generating fibers, one end of the ends of the plurality of power generating fibers are fixed to an edge of the piston head, and the electricity generating module further includes an elastic structure connected to a central portion of the piston head to apply an elastic force in a direction in which the piston is inserted into the cylinder.

4. The electricity generating module of claim 1, further comprising:

a first buoyancy structure fixedly connected to the piston; and a second buoyancy structure fixedly connected to the cylinder and having smaller buoyancy than the first buoyancy structure.

5. The electricity generating module of claim 4, wherein the electricity generating module is provided in a fluid environment, a difference in motion is generated between the first buoyancy structure and the second buoyancy structure by a movement of the fluid, and the piston reciprocates in the cylinder by the difference in motion between the first buoyancy structure and the second buoyancy structure.

6. The electricity generating module of claim 4, wherein the first buoyancy structure includes a life jacket, the life jacket includes a signal unit including at least one of a GPS location transmitter and an LED, and the electricity generated by the electricity generating module is supplied to the signal unit.

7. The electricity generating module of claim 1, wherein the electricity generating module is provided in a fluid environment, and further includes a first buoyancy structure fixedly connected to the piston and floating on the fluid, the cylinder is fixedly connected to a wearer of the first buoyancy structure, and the piston reciprocates inside the cylinder by an external force of the wearer.

8. The electricity generating module of claim 1, wherein a surface area of the power generating fiber varies as the length of the power generating fiber varies, and the potential value of the power generating fiber varies as the surface area of the power generating fiber varies.

9. The electricity generating module of claim 8, wherein the electricity generating module is provided in a fluid environment, the power generating fiber has a twisted structure, when the length of the power generating fiber is increased, a number of twists of the power generating fiber is decreased so that the surface area of the power generating fiber is increased and a contact area with the fluid is increased, and when the length of the power generating fiber is reduced, a number of twists of the power generating fiber is increased so that the surface area of the power generating fiber is reduced and the contact area with the fluid is reduced.

10. The electricity generating module of claim 1, wherein the power generating fiber includes twisted carbon nanotubes (CNTs) arranged in one direction.

11. An electricity generating method by an electricity generating module which includes a cylinder, a piston reciprocating inside the cylinder, and a power generating fiber having one end fixed to the piston and an opposite end fixed to the cylinder, the electricity generating method comprising:

allowing the piston to reciprocate in the cylinder by a fluid including seawater;

changing a length of the power generating fiber according to reciprocation of the piston, changing a surface area of the power generating fiber according to a change in the length of the power generating fiber, and changing a potential value according to a change in the surface area of the power generating fiber; and generating power by using the changed potential value of the power generating fiber, wherein the cylinder includes a plurality of fluid inlets configured to communicate the fluid between an outside and an inside of the cylinder while the piston reciprocates in the cylinder, and wherein the fluid is used as an electrolyte to generate a potential value that varies based on the power generating fiber.

12. The electricity generating method of claim 11, wherein the electricity generating module is provided in a fluid environment and the power generating fiber has a twisted structure, wherein, in the changing of the potential value, when the length of the power generating fiber is increased, a number of twists of the power generating fiber is decreased so that the surface area of the power generating fiber is increased and a contact area with the fluid is increased, and when the length of the power generating fiber is reduced, a number of twists of the power generating fiber is increased so that the surface area of the power generating fiber is reduced and the contact area with the fluid is reduced.

* * * * *